United States Patent
Buckley

(10) Patent No.: US 10,631,224 B2
(45) Date of Patent: Apr. 21, 2020

(54) AUTHENTICATING USER EQUIPMENTS THROUGH RELAY USER EQUIPMENTS

(71) Applicant: BlackBerry Limited, Waterloo, Ontario (CA)

(72) Inventor: Adrian Buckley, Tracy, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/725,563

(22) Filed: Oct. 5, 2017

(65) Prior Publication Data
US 2019/0110238 A1    Apr. 11, 2019

(51) Int. Cl.
| | |
|---|---|
| H04W 36/36 | (2009.01) |
| H04B 7/155 | (2006.01) |
| H04W 88/04 | (2009.01) |
| H04W 60/00 | (2009.01) |
| H04W 12/06 | (2009.01) |
| H04W 8/06 | (2009.01) |
| H04L 29/06 | (2006.01) |
| H04W 12/00 | (2009.01) |

(52) U.S. Cl.
CPC ........ *H04W 36/36* (2013.01); *H04B 7/15592* (2013.01); *H04W 8/06* (2013.01); *H04W 12/06* (2013.01); *H04W 60/00* (2013.01); *H04W 88/04* (2013.01); *H04L 63/08* (2013.01); *H04L 63/0884* (2013.01); *H04W 12/001* (2019.01); *H04W 12/00518* (2019.01)

(58) Field of Classification Search
CPC ... H04W 36/36; H04W 88/04; H04B 7/15592
See application file for complete search history.

(56) References Cited

U.S. PATENT DOCUMENTS

| | | | |
|---|---|---|---|
| 7,818,580 B2 * | 10/2010 | Bardsley | H04L 63/0272 708/135 |
| 2007/0211659 A1 | 9/2007 | Li et al. | |
| 2007/0238461 A1 * | 10/2007 | Lundin | H04W 8/12 455/436 |
| 2008/0130647 A1 * | 6/2008 | Ohba | H04L 61/2015 370/392 |
| 2011/0264807 A1 * | 10/2011 | Hlibiciuc | H04M 7/0093 709/227 |
| 2015/0131618 A1 | 5/2015 | Chen | |
| 2016/0212780 A1 | 7/2016 | Stojanovski et al. | |
| 2016/0323248 A1 * | 11/2016 | Zeira | H04W 4/21 |
| 2016/0344566 A1 | 11/2016 | Pudney | |

(Continued)

FOREIGN PATENT DOCUMENTS

CN       105828453 A      8/2016

OTHER PUBLICATIONS

ISA/US, International Search Report and Written Opinion for PCT/US2018/053913 dated Jan. 9, 2019 (14 pages).

(Continued)

*Primary Examiner* — Wei Zhao
(74) *Attorney, Agent, or Firm* — Trop, Pruner & Hu, P.C.

(57) ABSTRACT

In some examples, a first user equipment (UE) sends an indication to an application server that the first UE is to use a relay UE to access a network. The first UE receives, from the application server, a first identity different from a second identity of the first UE. The first UE uses the first identity to register with the network to authenticate the first UE.

16 Claims, 25 Drawing Sheets

(56) References Cited

U.S. PATENT DOCUMENTS

2017/0013653 A1 1/2017 Suzuki et al.
2017/0118643 A1 4/2017 Bergius et al.
2017/0272121 A1 9/2017 Dao et al.

OTHER PUBLICATIONS

ISA/US, International Search Report and Written Opinion for PCT/US2018/053913 dated Jan. 22, 2019 (10 pages).
Aboda et al., Network Working Group, Request for Comments: 3748, Obsoletes: 2284, Category: Standards Track, Extensible Authentication Protocol (EAP), Jun. 2004 (67 pages).
Haverinen et al., Network Working Group, Request for Comments: 4186, Category: Informational, Extensible Authentication Protocol Method for Global System for Mobile Communications (GSM) Subscriber Identity Modules :EAP-SIM) Jan. 2006 (92 pages).
Arkko et al., Network Working Group, Request for Comments: 4187, Category: Informational, Extensible Authentication Protocol Method for 3rd Generation Authentication and Key Agreement (EAP-AKA), Jan. 2006 (79 pages).
Arkko et al., Network Working Group, Request for Comments: 5448, Updates: 4187, Category: Informational, Improved Extensible Authentication Protocol Method for 3rd Generation Authentication and Key Agreement (EAP-AKA') May 2009 (29 pages).
D. Hardt, Internet Engineering Task Force (IETF), Request for Comments: 6749, Obsoletes: 5849, Category: Standards Track, ISSN: 2070-1721, the OAuth 2.0 Authorization Framework, Oct. 2012 (76 pages).
Jones et al., Internet Engineering Task Force (IETF), Request for Comments: 7523, Category: Standards Track, ISSN: 2070-1721, JSON Web Token (JWT) Profile for OAuth 2.0 Client Authentication and Authorization Grants, May 2015 (12 pages).
3GPP TSG SA WG3 (Security) Meeting #87 S3-171412, Ljubljana,Slovenia revision of S3-17xabc, Source: KPN, Title: Introduction of Key Issue on IMSI privacy in attach via eRemote UE, Document for: Approval, Agenda Item: 8.5, May 15-19, 2017 (2 pages).
3GPP TSG SA WG3 (Security) Meeting #87 S3-171580, Ljubljana,Slovenia revision of S3-171412 Source: KPN Title: Introduction of Key Issue on IMSI privacy in attach via eRemote UE Document for: Approval Agenda Item: 8.5, May, 15-19, 2017 (2 pages).
3GPP TS 23.501 V1.4.0 Technical Specification 3rd Generation Partnership Project; Technical Specification Group Services and System Aspects; System Architecture for the 5G System; Stage 2 (Release 15) (Sep. 2017) (151 pages).
3GPP TS 23.502 V1.2.0 Technical Specification 3rd Generation Partnership Project; Technical Specification Group Services and System Aspects; Procedures for the 5G System; Stage 2 (Release 15) (Sep. 2017)(165 pages).
3GPP TR 23.733 V15.0.0 Technical Report 3rd Generation Partnership Project; Technical Specification Group Services and System Aspects; Study on Architecture Enhancements to ProSe UE-to-Network Relay (Release 15) (Sep. 2017) (81 pages).
3GPP TR 33.843 0.2.0 Technical Report 3rd Generation Partnership Project; Technical Specification Group Services and System Aspects; Study on security Architecture Enhancements to ProSe UE-to-Network Relay (Release 15) (Aug. 2017) (31 pages).
3GPP TS 33501 V0.3.0 Technical Specification 3rd Generation Partnership Project; Technical Specification Group Services and System Aspects; Security Architecture and Procedures for 5G System (Release 15) (Aug. 2017) (44 pages).
3GPP TS 33.180 V14.1.0 Technical Specification 3rd Generation Partnership Project; Technical Specification Group Services and System Aspects; Security of the mission critical service; (Release 14) (Sep. 2017) (131pages).
3GPP TS 31.103 V15.0.0 Technical Specification 3rd Generation Partnership Project; Technical Specification Group Core Network and Terminals; Characteristics of the IP Multimedia Services Identity Module (ISIM) application (Release 14) (Sep. 2017) (52 pages).
3GPP TS 31.102 V14.3.0 Technical Specification 3rd Generation Partnership Project; Technical Specification Group Core Network and Terminals; Characteristics of the Universal Subscriber Identity Module (USIM) application (Release 14) (Jun. 2017) (295 pages).
3GPP TS 29.274 V15.1.0 Technical Specification 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 15) (Sep. 2017) (405 pages).
3GPP TS 24.301 V15.0.1 Technical Specification 3rd Generation Partnership Project; Technical Specification Group Core Network and Terminals; Non-Access-Stratum (NAS) protocol for Evolved Packet System (EPS); Stage 3 (Release 15) (Sep. 2017) (507 pages).
3GPP TS 24.302 V15.0.1 Technical Specification 3rd Generation Partnership Project; Technical Specification Group Core Network and Terminals; Access to the 3GPP Evolved Packet Core (EPC) via non-3GPP access networks; Stage 3 (Release 15) (Sep. 2017) (168 pages).
3GPP TS 29.002 V15.1.0 Technical Specification 3rd Generation Partnership Project; Technical Specification Group Core Network and Terminals; Mobile Application Part (MAP) specification (Release 15) (Sep. 2017) (1021 pages).
3GPP TS 29.272 V13.11.0 Technical Specification 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 13) (Sep. 2017) (162 pages).
3GPP TS 24.008 V15.0.0 Technical Specification 3rd Generation Partnership Project; Technical Specification Group Core Network and Terminals; Mobile radio interface Layer 3 specification; Core network protocols; Stage 3 (Release 15) (Sep. 2017) (802 pages).

* cited by examiner

Table 1

---

4.2.X EF_AS (identity for AS for Layer 2 Relay access)
This EF contains the APN and the IP address of an application server that a Remote UE should use to obtain identity from to use a Layer 3 Relay.

| Identifier: '6Fxx' | Structure: transparent | optional |
|---|---|---|
| SFI: 'xx' | | |
| File size: X bytes | Update activity: low | |

Access Conditions:
    READ                    PIN
    UPDATE             ADM
    DEACTIVATE      ADM
    ACTIVATE         ADM

| Bytes | Description | M/O | Length |
|---|---|---|---|
| X | AS address | O | X |
| X+1 to X+Y | Network Access Point | O | Y |

AS address

Contents:

- Address of AS, in the format of a FQDN, an IPv4 address, or an IPv6 address.

Coding:

- The tag value of this AS address TLV data object shall be '80'. The format of the data object is as follows:

| Field | Length (bytes) |
|---|---|
| Tag | 1 |
| Length | 1 |
| Address Type | 1 |
| AS Address | Address Length |

Address Type:    Type of the AS address.

This field shall be set to the type of AS address according to the following:

| Value | Name |
|---|---|
| '00' | FQDN |
| '01' | IPv4 |
| '02' | IPv6 |
| All other values are reserved | |

AS Address:    Address of the AS used to provide UE with identity to be used when using a Layer 2 Relay This field shall be set to the address of the AS. When the AS type is set to '00', the corresponding AS Address shall be encoded to an octet string according to UTF-8 encoding rules as specified in IETF RFC 3629 [27].

Unused bytes shall be set to 'FF'.

FIG. 13A

Network Access Point
Contains an APN that is used by the ME when using the NAI
   Coding

- The tag value of this AS address TLV data object shall be '81'. The format of the data object is as follows:

| Field | Length (bytes) |
|---|---|
| Tag | 1 |
| Length | 1 |
| APN | Address Length |

See APN in 3GPP TS 23.003

FIG. 13B

Table 2

B.1.1 ID token

B.1.1.0 General

The ID Token shall be a JSON Web Token (JWT) and contain the following standard and MCX token claims. Token claims provide information pertaining to the authentication of the MCX user by the IdM server as well as additional claims. This clause profiles the required standard and MC claims for the MCX Connect profile.

B.1.1.3 UICC claims

The UICC Connect profile extends the OpenID Connect standard claims with the additional claims shown in table B.1.1.3-1.

Table B.1.1.3-1: ID token UICC claims

| Parameter | Description |
|---|---|
| NAS identity | Optional. This contains the identity of the identity of the Remote UE when the Remote UE sends a NAS message for Layer 2 access. It may include:<br>• Public User Identity of the Remote UE<br>• Private User Identity of the Remote UE<br>• |
| | |
| | |

NOTE: Each xxxx of the parameter shall be appended with a numeric value representing the next instance.

B.3.1.3 Token request

In order to exchange the authorization code for an ID token, access token and refresh token, the MCX client makes a request to the authorization server's token endpoint by sending the following parameters using the "application/x-www-form-urlencoded" format, with a character encoding of UTF-8 in the HTTP request entity-body. Note that client authentication is REQUIRED for native applications (using PKCE) in order to exchange the authorization code for an access token. Assuming that client secrets are used, the client secret is sent in the HTTP Authorization Header. The token request standard parameters are shown in table B.3.1.3-1.

Table B.3.1.3-1: Token Request standard required parameters

| Parameter | Values |
|---|---|
| grant_type | REQUIRED. The value shall be set to "authorization_code". |
| code | REQUIRED. The authorization code previously received from the IdM server as a result of the authorization request and subsequent successful authentication of the MCX user. |
| client_id | REQUIRED. The identifier of the client making the API request. It shall match the value that was previously registered with the OAuth Provider during the client registration phase of deployment, or as provisioned via a development portal. |
| redirect_uri | REQUIRED. The value shall be identical to the "redirect_uri" parameter included in the authorization request. |
| code_verifier | REQUIRED. A cryptographically random string that is used to correlate the authorization request to the token request. |

FIG 14A

| Relay UE identity | Optional. This contains the identity of the Relay UE when the Remote UE associated / set-up a connection with the Relay UE. It may include: <ul><li>Public User Identity of the Relay UE</li><li>Private User Identity of the Relay UE</li></ul> |
|---|---|
| Service Network of Relay UE | Identity of the Network that is serving the Relay UE |
| Location | Can be:<br><br>Service Provider Identity<br><br>LA, RA, TA |
| Private_User_Identity | Optional Private User identities from UICC Application |
| NOTE: Each instance of the parameter shall be appended with a numeric value representing the next instance. ||

An example of a token request for MCX Connect might look like.

EXAMPLE:

```
POST /as/token.oauth2 HTTP/1.1
Host: IdM.server.com:9031
Cache-Control: no-cache
Content-Type: application/x-www-form-urlencoded grant_type=authorization_code&code=SplxlOBeZQQYbYS6WxSbIA&client_id=myNativeApp&code_verifi
er=0x123456789abcdef&redirect_uri=http://3gpp.mcptt/cb&Relay_UE_identity=user@domain.com&Se
rvice_network_of_relay_UE=mcc233mnc456&Location=41°24'12.2"N 2°10'26.5"E
```

B.3.1.4 Token response

If the access token request is valid and authorized, the IdM server returns an ID token, access token and refresh token to the MCX client; otherwise it will return an error.

An example of a successful response might look like:

EXAMPLE:

```
HTTP/1.1 200 OK
    Content-Type: application/json;charset=UTF-8
    Cache-Control: no-store
    Pragma: no-cache
    {
"access_token":"eyJhbGciOiJSUzI1NiJ9.eyJtY3B0dF9pZCI6ImFsaWNlQG9yZy5jb20iLCJleHAiOjE0NTM1MD
YxMjEsInNjb3BlIjpbIm9wZW5pZCIsIjNncHA6bWNwdHQ6cHR0X3NlcnZlciJdLCJjbGllbnRfaWQiOiJtY3B0dF9jb
GllbnQifQ.XYIqai4YKSZCKRNMLipGC_5nV4BE79IJpvjexWjIqqcqiEx6AmHHIRoOmhcxeCESrXei9krom9e8Goxr_
hgF3szvgbwl8JRbFuv97XgepDLjEq4jL3Cbu41Q9b0WdXAdFmeEbiB8wo_xggiGwv6IDRlb3TgAAsdjkRxSK4ctIKPa
OJSRmM7MKMcKhIug3BEkSC9-aXBTSIv5fAGN-ShDbPvHycBpjzKWXBvMIR5PaCg-
9fwjELXZXdRwz8C6JbRM8aqzhdt4CVhQ3-Arip-S9CKd0tu-qhHfF2rvJDRlg8ZBiihdPH8mJs-qpTFep_1-
kON3mL0_g54xVmlMwN0XQA",
    "refresh_token":"Y7NSzUJuS0Jp7G4SKpBKSOJVHIZxFbxqsqCIZhOEk9",
"id_token":"eyJhbGciOiJSUzI1NiJ9.eyJzdWIiOiIxMjM0NTY3ODkwIiwiYXVkIjoibWNwdHRfY2xpZW50IiwiaX
NzIjoiSWRNUy5zZXJ2ZXIuY29tOjkwMzEiLCJpYXQiOjE0NTM0OTgxNTgsImV4cCI6MTQ1MzQ5ODQ1OCwibWNwdHRfa
WQiOiJhbGljZUBvcmcuY29tIn0.Dpn7AhIMaqMEggl2NYUUfJGSFJMPG8M2li9FLtPotDlHvwU2emBws8z5JLw81SXQ
noLqZ8ZF8tIhZ1W7uuMbufF4Wsr7PAadZixz3CnV2wxFV9qR_VA1-
0ccDTPukUsRHsic0SgZ3aIbcYKd6VsehFe_GDwfqysYzD7yPwCfPZo",
"token_type": "Bearer",
"expires_in": 7199
}
```

FIG 14B

The MCX client may now validate the user with the ID token and configure itself for the user (e.g. by extracting the MC service ID from the ID Token). The MCX client then uses the access token to make authorized requests to the MCX resource servers (MCPTT server, MCVideo server, MCData server, KMS, etc.) on behalf of the end user.

Annex C (informative):
OpenID connect detailed flow

C.1  Detailed flow for MC user authentication and registration using OpenID Connect Figure D.1-1 shows the detailed flow for MC User Authentication and Registration using the OpenID Connect messages as described in annex B.

[FIGURE D.1-1 OMITTED; THE BELOW REFERS TO STEPS OF FIGURE D.1-1 OF THE STANDARD]

Step 0:   The UE attaches to the network, establishes normal connectivity, and sets up network security as defined in 3GPP TS 33.401 [14]. Local P-CSCF in the Home IMS network is discovered at this point.

Step 1:   The UE IMS/SIP Client authenticates with the primary IMS/SIP core. For IMS authentication, 3GPP TS 33.203 [9] applies.

Step 2:   The SIP core sends a SIP 3rd Party Registration to the MCX application Server(s), notifying them of the MC UE SIP registration. The 3rd party REGISTER message includes the registered IMPU and S-CSCF's SIP-URI or IP Address.

Step 3a:  The IdM client in the UE issues a HTTPS Authentication request to the OIDC based IdM Server in the MC network. The client includes the code_challenge value in this request.

Step 3b:  The MC User Identity and associated credentials are provided to the IdM server. The credentials are successfully authenticated (and optionally authorized) by the IdM Server.

a) As part of Step 3a, 3b or 3e the UE includes the following information in the message sent to the IdM server:

b) Identity of the Relay UE.

c) Location of the Relay UE d) Identity of the Network serving the Relay UE.

Step 3c:  The IdM Server may optionally request user consent for granting the MCX client access to the MCX service in the MCX Server.

Step 3d:  The IdM Server generates an authorization code that is associated with the code_challenge provided by the client. It sends a browser redirect HTTP message with the Authorization Response containing the authorization code.

Step 3e:  The UE IdM Client performs a HTTP POST request to exchange the authorization code for an access token. In the request, the client includes the code-verifier string. This string is cryptographically associated with the code_challenge value provided in the Authorization Request in Step 3a.

Step 3f: The IdM Server verifies the IdM Client based on the received code-verifier string and issues a 200 OK with an access token and ID token (specific to the MC user and MCX service(s)) included in it. The ID

FIG 14C token contains the JSON Web Token claim containing at least one of identity (e.g. NAS identity) that the UE should use when it Registers to access system X.

NOTE:        System X could be Cellular network etc.

NOTE:        The server verifies by calculating the code challenge from the received code_verifier and comparing it with the code_challenge value provided by the client in Step 3a.

Step 3g:        The access token and ID token are made available to the MCX client(s).

Step 4:        The MC UE performs user service authorization using the NAS identity extracted from the ID token.

FIG 14D

Table 4

| |
|---|
| 6.2.5 Layer_2_Relay_ID_server_config configuration<br><br>If the UE performs 3GPP-based access authentication, the 3GPP AAA server may send a temporary ID from the non-3GPP access network to the UE during the EAP-AKA or EAP-AKA' based access authentication (i.e. EAP-AKA, EAP-AKA'). The indicator is sent using a AT_Layer_2_Relay_ID_server_config_RESP, by extending the EAP-AKA (and EAP-AKA') protocol as specified in subclause 8.2 of IETF RFC 4187 [33]. This attribute is provided in EAP-Request/AKA-Challenge or EAP- Request/AKA'-Challenge message payload respectively. The detailed coding of this attribute is described in subclause 8.2.X.1.<br><br>6.XA Layer_2_Relay_ID_server_config configuration (X could be a 4 or a 5, so 6.4A or 6.5A, etc.)<br>6.XA.1  UE Procedures<br><br>3-4)  If:<br>   a) the UE supports the "Configuration request";<br><br>   b) the EAP-Request/AKA'-Challenge message includes the AT_Layer_2_Relay_ID_server_config_REQUEST_SUPPORTED attribute as described in subclause 8.2.X.1 wherein the message field as described in subclause 8.1.4.1:<br><br>     1) contains the message type field indicating Layer_2_Relay_ID_server_config_REQUEST_SUPPORTED; and<br><br>     2) contains the type field including the Layer_2_Relay_ID_server_config Request Supported field item as described in subclause 8.2.X.1 indicating Layer_2_Relay_ID_server_config Supported; and<br><br>   c) the UE requests usage of the " Layer_2_Relay_ID_server_config ";<br><br>5-6)  then the UE:<br><br>   a) shall include the AT_Layer_2_Relay_ID_server_config_REQUEST attribute according to subclause 8.2.X.2 in the EAP-Response/AKA'-Challenge message. In the message field according to subclause 8.1.4.1 of the AT_Layer_2_Relay_ID_server_config_REQUEST attribute, the UE shall:<br><br>     1) set the message type field to Layer_2_Relay_ID_server_config_REQUEST; and<br><br>     2) contains the type field including the Layer_2_Relay_ID_server_config Request field item as described in subclause 8.2.X.2 indicating Layer_2_Relay_ID_server_config requested; and<br><br>7-8) Upon receiving the EAP-Request/AKA'-Notification message including the AT_Layer_2_Relay_ID_server_config_RESP attribute as described in subclause 8.2.X.3 where the message field as described in subclause 8.1.4.1:<br>   - contains the message type field indicating Layer_2_Relay_ID_server_config_RESP; and<br><br>   - contains the field Layer_2_Relay_ID_server_config Encoded;<br><br>the UE:<br>   - stores the Layer_2_Relay_ID_server_config received to be used to determine if a dialled call is an emergency call. |

FIG. 15A

If this message is received in EAP-AKA' signalling used in tunnel set-up to an ePDG, the received Layer_2_Relay_ID_server_config shall be considered an alternative Layer_2_Relay_ID_server_config to use by the UE.

6.XA.2   AAA Procedures

The 3GPP AAA server may support Layer_2_Relay_ID_server_config configuration.

3-4) If the network supports Layer_2_Relay_ID_server_config configuration, the 3GPP AAA server shall include
  a) in the EAP-Request/AKA'-Challenge message, the AT_Layer_2_Relay_ID_server_config_REQUEST_SUPPORTED attribute as described in subclause 8.2.X.1, wherein the message field as described in subclause 8.1.4.1:

1) contains the message type field indicating Layer_2_Relay_ID_server_config_REQUEST_SUPPORTED; and 2) contains the type field including the Layer_2_Relay_ID_server_config Request Supported field item as described in subclause 8.2.X.1 indicating Layer_2_Relay_ID_server_config Supported; and 5-6) If the 3GPP AAA server supports Layer_2_Relay_ID_server_config configuration; and the AAA server receives the AT_Layer_2_Relay_ID_server_config_REQUEST attribute according to subclause 8.2.X.2 in the EAP-Response/AKA'-Challenge message and In the message field according to subclause 8.1.4.1 of the AT_Layer_2_Relay_ID_server_config_REQUEST attribute 1) the message type field is set to Layer_2_Relay_ID_server_config_REQUEST; and 2) contains the type field including the "Layer_2_Relay_ID_server_config_REQUEST_SUPPORTED" value (see Table 8.1.4.1-2) as described in subclause 8.2.X.2 indicating Layer_2_Relay_ID_server_config requested;

then the AAA server optionally contacts an external database e.g. HSS, PCRF to obtain the Layer_2_Relay_ID_server_config to be used and provides those Layer_2_Relay_ID_server_config in the EAP-RSP/AKA'-identity message.

7-8) The AAA sends the EAP-Request/AKA'-Notification message including the AT_Layer_2_Relay_ID_server_config_RESP attribute as described in subclause 8.2.X.3 where the message field as described in subclause 8.1.4.1:
  - contains the message type field indicating Layer_2_Relay_ID_server_config_RESP; and
  - contains the field Layer_2_Relay_ID_server_config Encoded as described in subclause 8.2.x.3.2;

8      PDUs and parameters specific to the present document
  8.1   3GPP specific coding information defined within present document
8.1.4    PDUs for TWAN connection modes
8.1.4.1        Message
The message is coded according to table 8.1.4.1-2.

Table 8.1.4.1-2: Message type

| The value is coded as follows. | | | | | | | | |
|---|---|---|---|---|---|---|---|---|
| 7 | 6 | 5 | 4 | 3 | 2 | 1 | 0 | |
| 0 | 0 | 0 | 0 | 0 | 0 | 0 | 1 | CONNECTION_CAPABILITY |

FIG. 15B

```
0 0 0 0 0 0 1 0    SCM_REQUEST
0 0 0 0 0 0 1 1    SCM_RESPONSE
0 0 0 0 0 1 0 0    MCM_REQUEST
0 0 0 0 0 1 0 1    MCM_RESPONSE
0 0 0 0 0 1 1 1    Layer_2_Relay_ID_server_config_REQUEST_SUPPORTED
0 0 0 0 1 0 0 0    Layer_2_Relay_ID_server_config_REQUEST
```

8.2.X  Identity attributes
8.2.X.1    AT_Layer_2_Relay_ID_server_config_Request_Supported attribute

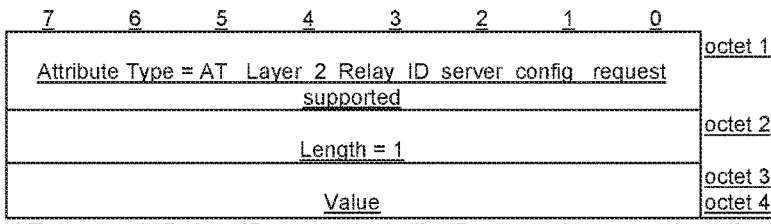

Figure 8.2.X.1-1: AT_Layer_2_Relay_ID_server_config_Request Supported attribute

Table 8.2.X.1-1: : AT_Layer_2_Relay_ID_server_config_Request Supported

Octet 1 (in Figure 8.2.X.1-1) indicates the type of attribute as
AT_Layer_2_Relay_ID_server_config_Request Supported.

Octet 2 (in Figure 8.2.X.1-1) is the length of this attribute which shall be set to 1 as per
IETF RFC 4187 [33]

Octets 3 (in Figure 8.2.X.1-1) and 4 (in Figure 8.2.X.1-1) are the value of the attribute. Octet 3 (in
Figure 8.2.X.1-1) is reserved and shall be coded as zero. Octet 4 (in Figure 8.2.X.1-1) shall be set as
follows. All other values are reserved.

```
7 6 5 4 3 2 1 0     Layer_2_Relay_ID_server_config Request Supported field
0 0 0 0 0 0 0 1     Layer_2_Relay_ID_server_config Request Supported
0 0 0 0 0 0 1 0     Layer_2_Relay_ID_server_config Request not supported
1 1 1 1 1 1 1 1     Reserved
```

8.2.X.2    AT_Layer_2_Relay_ID_server_config_Request attribute

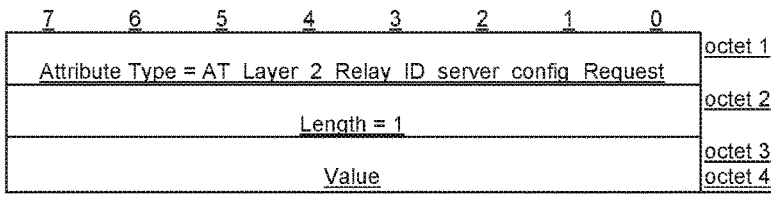

Figure 8.2.X.2-1: AT_Layer_2_Relay_ID_server_config_Request attribute

FIG. 15C

Table 8.2.X.2-1: : AT_Layer_2_Relay_ID_server_config_Request attribute

| Octet 1 (in Figure 8.2.X.2-1) indicates the type of attribute as AT_Layer_2_Relay_ID_server_config_Request with a value of 1XX. |
|---|
| Octet 2 (in Figure 8.2.X.2-1) is the length of this attribute which shall be set to 1 as per IETF RFC 4187 [33] |
| Octet 3 (in Figure 8.2.X.2-1) and 4 (in Figure 8.2.X.2-1) is the value of the attribute. Octet 3 (in Figure 8.2.X.2-1) is reserved and shall be coded as zero. Octet 4 (in Figure 8.2.X.2-1) shall be set as follows. All other values are reserved. <br><br> 7 6 5 4 3 2 1 0   Layer_2_Relay_ID_server_config requested field <br> 0 0 0 0 0 0 0 1   Layer_2_Relay_ID_server_config requested <br> 0 0 0 0 0 0 1 0   Reserved to <br> 1 1 1 1 1 1 1 1   Reserved |

8.2.X.3 AT_Layer_2_Relay_ID_server_config_RESP attribute

8.2.X.3.1 General

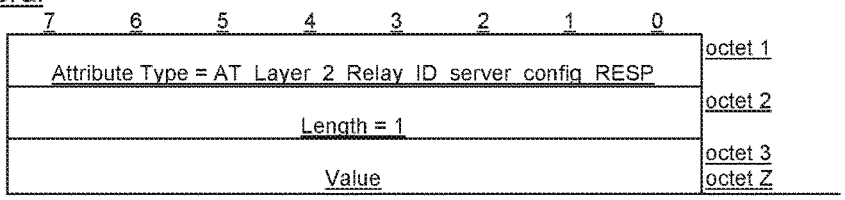

Figure 8.2.X.3-1: AT_Layer_2_Relay_ID_server_config_RESP attribute

8.2.x.3.2 Layer_2_Relay_ID_server_config encoded

There may be multiple Layer_2_Relay_ID_server_configs encoded in the AT_Layer_2_Relay_ID_server_config_RESP attribute.

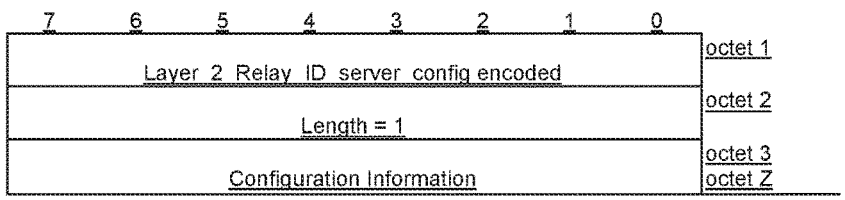

Figure 8.2.X.3-1: AT_Layer_2_Relay_ID_server_config RESP attribute Value

Table 8.2.X.3-1: : AT_Layer_2_Relay_ID_server_config_RESP attribute Value

| Octet 1 (in Figure 8.2.X.3-1) indicates the identity that is encoded. |
|---|
| Octet 1 (in Figure 8.2.X.3-1) shall be set as follows. All other values are reserved. <br><br> 7 6 5 4 3 2 1 0   Layer_2_Relay_ID_server_config Encoded field <br> 0 0 0 0 0 0 0 1   Reserved <br> 0 0 0 0 0 0 1 0   Reserved <br> 0 0 0 0 0 0 1 1   Temporary ID – GUTI <br> 0 0 0 0 0 1 0 0   Temporary ID – IMSI |

FIG. 15D

| 0 | 0 | 0 | 0 | 0 | 1 | 0 | 1 | Temporary ID - TMSI |
|---|---|---|---|---|---|---|---|---|
| 0 | 0 | 0 | 0 | 0 | 1 | 1 | 0 | Temporary ID – 5G GUTI |
| 0 | 0 | 0 | 0 | 0 | 1 | 1 | 1 | Reserved to |
| 1 | 1 | 1 | 1 | 1 | 1 | 1 | 1 | Reserved |

When Octet 1 is

1. GUTI encoding shall be as specified in 3GPP TS 24.301 sub-clause 9.9.3.12
2. IMSI encoding shall be as specified in 3GPP TS 24.301 sub-clause 9.9.3.12.
3. TMSI encoding shall be as specified in 3GPP TS 24.301 sub-clause 9.9.3.26
4. 5G-GUTI encoding shall be as specified in TBD

FIG. 15E

*Table 6*

| 3GPP TS 24.008 Section            10.5.6.3     Protocol configuration options |
|---|
| Table 10.5.154/3GPP TS 24.008: *Protocol configuration options* information element |

| |
|---|
| Configuration protocol (octet 3)<br>Bits<br>3 2 1<br>0 0 0    PPP for use with IP PDP type or IP PDN type (see 3GPP TS 24.301 [120])<br><br>All other values are interpreted as PPP in this version of the protocol. After octet 3, i.e. from octet 4 to octet z, two logical lists are defined:<br>-      the Configuration protocol options list (octets 4 to w), and<br>-      the Additional parameters list (octets w+1 to z).<br>Configuration protocol options list (octets 4 to w)<br>.......<br>Additional parameters list (octets w+1 to z)<br>The *additional parameters list* is included when special parameters and/or requests (associated with a PDP context) need to be transferred between the MS and the network. These parameters and/or requests are not related to a specific configuration protocol (e.g. PPP), and therefore are not encoded as the "Packets" contained in the *configuration protocol options list*.<br>The *additional parameters list* contains a list of special parameters, each one in a separate container. The type of the parameter carried in a container is identified by a specific *container identifier*. In this version of the protocol, the following container identifiers are specified:<br>MS to network direction:<br>-      0001H (P-CSCF IPv6 Address Request);<br>......<br>-      000EH (MSISDN Request);<br>-      000FH (IFOM-Support-Request);<br>-      0010H (IPv4 Link MTU Request);<br>-      0011H (MS support of Local address in TFT indicator); ~~and~~<br>-      <u>0012H (UE Relay capability activated);</u><br>-      <u>0013H (UE Relay capability deactivated); and</u><br>-      FF00H to FFFFH reserved for operator specific use.<br><br>Network to MS direction:<br>-      0001H (P-CSCF IPv6 Address);<br><br>-      0002H (IM CN Subsystem Signaling Flag);<br>.....<br>-      000FH (IFOM-Support);<br>-      0010H (IPv4 Link MTU);<br>-      0011H (Network support of Local address in TFT indicator); ~~and~~<br>-      <u>0012H *Provisioned services for Access Server*;</u><br>-      FF00H to FFFFH reserved for operator specific use....... |

FIG. 16

Table 7

---

10.5.x  Provisioned services for Access Server

The purpose of the *Provisioned services for Access Server* information element is provide configuration information to the Relay UE as to which APN and IP address should be used when a Remote UE performs initial authentication to obtain a temporary identity to use in an Attach message.

The *Coding for Provisioned services for Access Server* information element is as shown in figure 10.5.X/3GPP TS 24.008 and table 10.5.X/3GPP TS 24.008.

| 8 | 7 | 6 | 5 | 4 | 3 | 2 | 1 | |
|---|---|---|---|---|---|---|---|---|
| Provisioned services for Access Server IEI ||||||||  octet 1 |
| Length |||||||| octet 2 |
| Reserved | Reserved | Coding for Provisioned services for Access Server |||||| octet 3 |

Figure 10.5.X/3GPP TS 24.008 Provisioned services for Access Server information element

Table 10.5.X/3GPP TS 24.008: Coding for Provisioned services for Access Server

Bits
7 6
0 0     Reserved
1 0     Reserved

All other values are reserved.

Fixed network user rate (octet 6d)
Bit
5 4 3 2 1
0 0 0 0 0         APN Included.
0 0 0 0 1         Access Server Address included.
0 0 0 1 0         Reserved
to
0 1 0 0 0         Reserved

AUTHENTICATING USER EQUIPMENTS THROUGH RELAY USER EQUIPMENTS

BACKGROUND

Devices such as computers, handheld devices, vehicles, appliances, or other types of devices can communicate over wired or wireless networks. Wireless networks can include a wireless local area network (WLAN), which includes wireless access points (APs) to which devices are able to wirelessly connect. Other types of wireless networks include cellular networks that comprise wireless access network nodes to which devices are able to wirelessly connect.

BRIEF DESCRIPTION OF THE DRAWINGS

Some implementations of the present disclosure are described with respect to the following figures.

FIGS. 13A-13B show Table 1.
FIGS. 14A-14D show Table 2.
FIGS. 15A-15E show Table 4.
FIG. 16 shows Table 6.
FIG. 17 shows Table 7.

Figure 1:
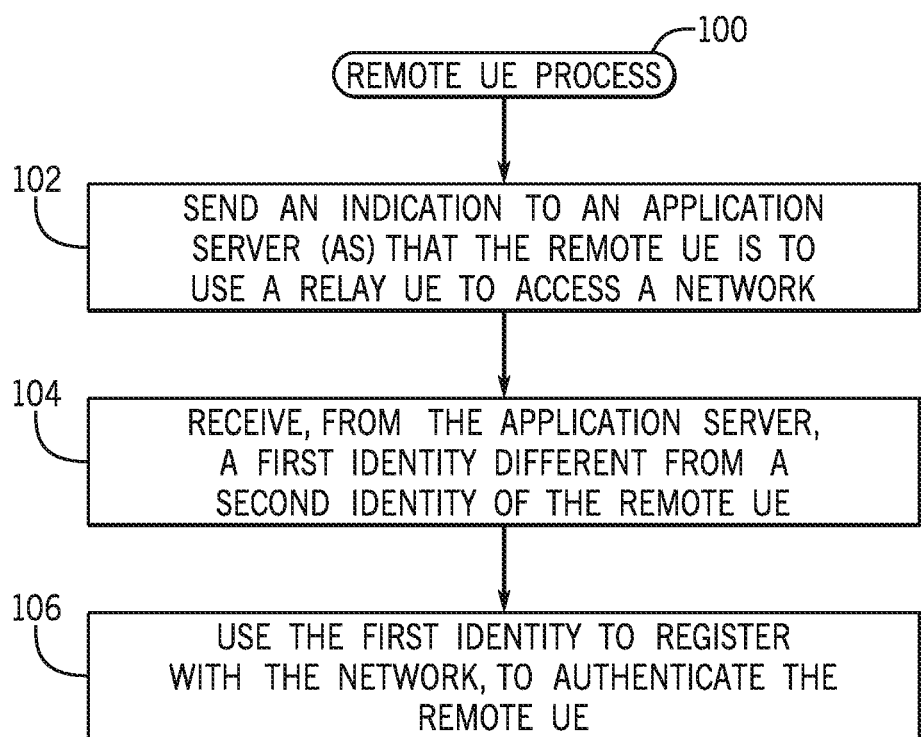
FIG. 1 is a flow diagram of a process of a Remote user equipment (UE) according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, wireless networks are cellular networks that operate according to cellular protocols. Cellular protocols include those provided by the Third Generation Partnership Project (3GPP), such as the Long-Term Evolution (LTE) standards. The LTE standards are also referred to as the Evolved Universal Terrestrial Radio Access (E-UTRA) standards. Cellular protocols can also include next generation protocols, including fifth generation (5G) and beyond protocols. Other cellular protocols can also be used in other examples.

Other examples of wireless networks include wireless local area network (WLANs). WLANs can include wireless networks but not limited to those that operate according to the Institute of Electrical and Electronic Engineers (IEEE) 802.11 or Wi-Fi Alliance Specifications, etc.

Although examples are provided of some wireless networks, techniques or mechanisms according to some implementations of the present disclosure can be used with any of various types of wireless networks.

Examples of wireless devices that are able to communicate in wireless networks include computers (e.g., tablet computers, notebook computers, desktop computers, etc.), handheld devices (e.g. smart phones, personal digital assistants, head-mounted device, etc.), wearable devices (smart watches, electronic eyeglasses, head-mounted devices, etc.), game appliances, health monitors, vehicles (or equipment in vehicles), cargo transportation units (e.g., trailers, containers, etc.), Internet of Things (IoT) devices, or other types of endpoint or user devices that are able to communicate wirelessly. Wireless devices can include mobile devices and/or fixed position devices. More generally, a wireless device can refer to an electronic device that is able to communicate wirelessly.

In the ensuing discussion, wireless devices are referred to as "user equipments (UEs)." A UE can refer to a UE with a UICC, or a Mobile Equipment (ME) without a UICC, or to any other type of wireless device.

As used here, a "Remote UE" can refer to a wireless device that may not have access to a wireless network, such as a cellular network. A Remote UE can use a Relay UE to access a wireless network, such as a cellular network. A "Relay UE" is a wireless device that allows another type of wireless device, such as a Remote UE, to use a Relay UE to access a wireless network. An example of a Relay UE is a Layer 2 Relay UE. A Remote UE is a UE of a first type, while a Relay UE is a UE of a second type different from the first type.

In some examples, the Remote UE communicates with the Relay UE using a first type of wireless technology, including any or some combination of the following: Bluetooth, WLAN, device-to-device (D2D) (such as PC5, ProSe D2D, Sidelink, Direct Short Range Communication (DSRC), IEEE 802.11p, etc.), Near Field Communication (NFC), NarrowBand IoT (NB-IoT), and so forth. The Relay UE can communicate with a wireless network using a second type of wireless technology, such as Universal Terrestrial Radio Access Network (UTRAN), GSM EDGE Radio Access Network (GERAN), Enhanced Data Rates for GSM Evolution (EDGE), WLAN, LTE, 5G, and so forth.

In more specific examples, a Layer 2 Relay UE allows a Remote UE to access connectivity and services provided by a 3GPP network through the Relay UE. In some examples, Network Access Stratum (NAS) signaling communicated by the Remote UE can pass transparently through a relay function in the Relay UE with the 3GPP network. The relay function can be provided as part of Layer 2 of the Relay UE.

In examples where the wireless network is an Evolved UTRAN (e-UTRAN), then the Remote UE can refer to an eRemote UE, and the Relay UE can refer to an eRelay UE.

In the context of public safety services, such as according to Mission Critical Push to Talk (MCPTT) as defined by 3GPP, a Relay UE can refer to an entity that can be deployed to extend 3GPP coverage to a device that may not have 3GPP coverage, such as in scenarios of a vehicle accident or emergency incident where a first responder group (such as the police) can set up one or more Relay UEs to provide better coverage to other first responders attending the incident.

An issue that arises in the context where a Remote UE is to access a wireless network using a Relay UE, such as a Layer 2 Relay UE, involves the performing of network authentication of the Remote UE where the Remote UE does not want to divulge its private identity. A private identity can also be referred to as a Private User Identity (ID). Generally, a property of a private identity is that the private identity is only known to the wireless network and to the Remote UE.

An example of a Private User ID associated with a Remote UE can include a Session Initiation Protocol (SIP) Uniform Resource Identifier (URI) or an IMSI. As a further example, a Private User ID can also be a Temporary ID. A Temporary ID can include any of the following: a Globally Unique Temporary ID (GUTI), a Temporary Mobile Subscriber Identity (TMSI), a Packet-Temporary Mobile Subscriber Identity (P-TMSI), a 5G-GUTI, and so forth. The characteristics of a Temporary ID is that the identity has a finite lifetime and can be assigned to another UE at a different time or in a different location.

In general, the term "identity" refers to either a private identity or a public identity.

FIG. 1 is a flow diagram of a process 100 that can be performed by a Remote UE to perform authentication. The Remote UE sends (at 102) an indication to an application server (AS) that the Remote UE is to use a Relay UE to access a network. An application server (also referred to as an "access server") is an entity that may perform any or some combination of the following: protocol interworking between a first protocol and a second protocol; an authentication function or a proxy authentication function; a function of a back-to-back user agent (B2BUA), which is a logical SIP network element; a user identity mapping function, an access and mobility management function (AMF); and so forth.

A B2BUA is a logical entity that receives a request and processes the request as a user agent server (UAS). To determine how the request should be answered, the B2BUA acts as a user agent client (UAC) and generates requests. Unlike a proxy server, the B2BUA maintains a dialog state and participates in all requests sent on the dialogs the B2BUA has established.

In some examples, it is assumed that the Remote UE does not have cellular connectivity. However, it is noted that techniques or mechanisms according to some implementations are also applicable in examples where the UE has cellular connectivity.

In the process 100, the Remote UE receives (at 104), from the application server, a first identity different from a second identity of the Remote UE. For example, the second identity can be a private identity of the Remote UE discussed above. On the other hand, the first identity can be a Temporary ID, for example.

The Remote UE uses (at 106) the first identity to register with the network, where the registration results in authentication of the Remote UE.

In this way, the Remote UE does not have to divulge its private identity when performing authentication.

Figure 2:
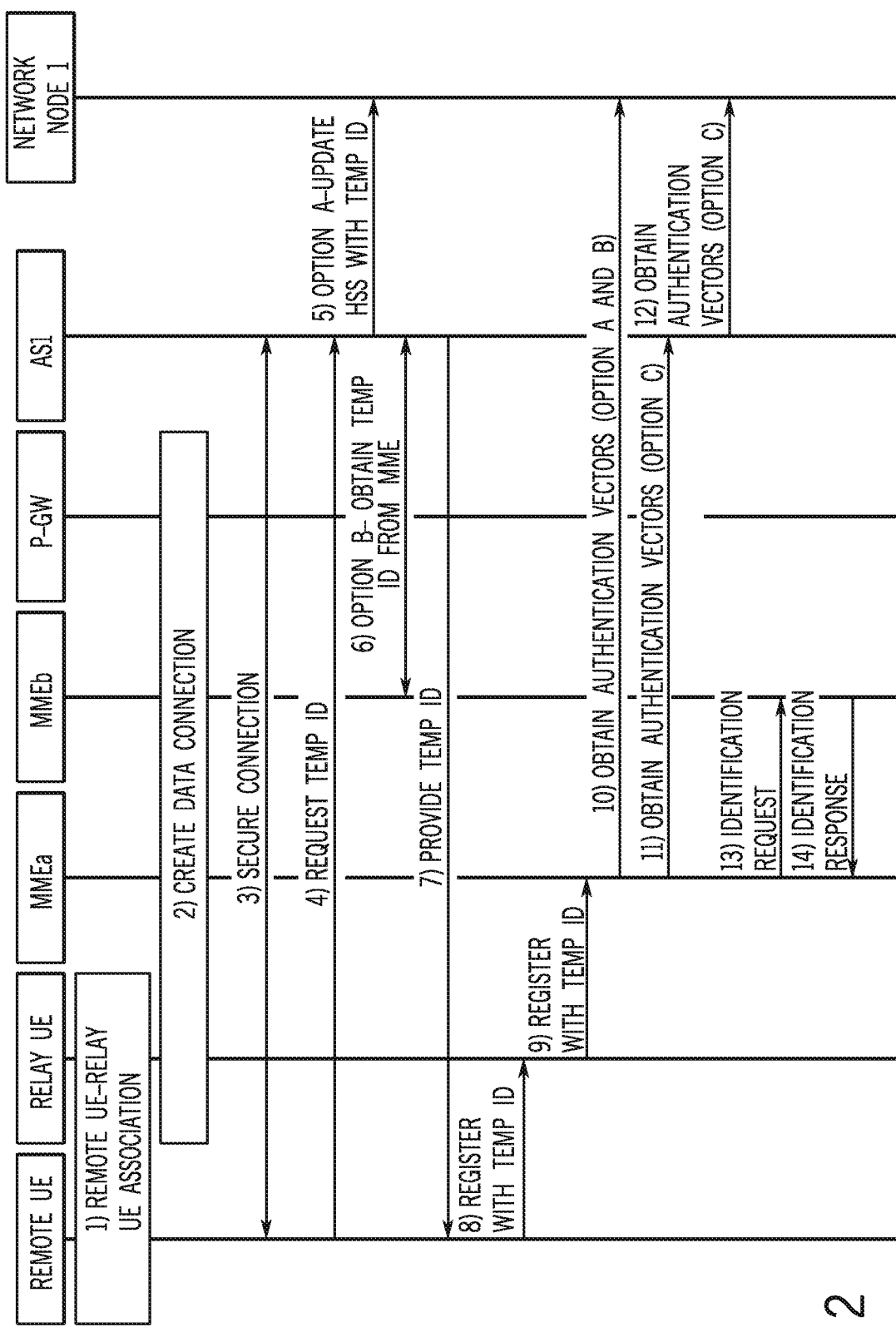
FIG. 2 is a message flow diagram of interactions between various nodes according to further examples.

FIG. 2 is a message flow diagram of an authentication process according to further examples that involves a Remote UE, a Relay UE, an application server labeled AS1, and various network nodes, including MMEa, MMEb, P-GW, and Network Node 1. MME represents "Mobility Management Entity," which is an LTE core network node that performs various control tasks to access by a UE of an LTE access network. In other examples, a different type of mobility management node can be used instead of an LTE MME, such as an Access and Mobility Management Function (AMF) of a 5G network.

In FIG. 2, MMEa and MMEb represent two different MMEs. Although two MMEs are shown in FIG. 2, it is noted in other examples, just one MME can be employed.

P-GW represents "Packet Data Network Gateway," which is an LTE core network node and is a gateway that is connected to a PDN (e.g., the Internet or another type of data network) for communicating traffic data packets between UEs and the PDN. In other examples, instead of a P-GW, a different type of core network node can be used for traffic data communications, such as a User Plane Function (UPF) of a 5G network.

In a different example, the AS1 can be replaced with a Non-3GPP Inter-Working Function (N3IWF) of a 5G network. Alternatively, the AS1 can be replaced with an Evolved Packet Data Gateway (ePDG). Thus, the term "application server" can refer to an application server, an N3IWF, an ePDG, or any other entity that is designated to perform specified tasks.

Network Node 1 shown in FIG. 1 is for performing authentication services. In some examples, Network Node 1 can include an Authentication Authorization Accounting (AAA) server, an Authentication Server Function (AUSF), or any other type of node that can provide authentication services.

FIG. 2 shows various tasks that can be performed among the entities shown in FIG. 2.

Task 1: The Remote UE registers and/or associates with the Relay UE. The registering and/or associating of the Remote UE with the Relay UE allows the Remote UE to exchange information with the Relay UE so that the Remote UE can obtain information of the Relay UE, such as configuration information of the Relay UE. Once the Remote UE and the Relay UE are associated, the Remote UE is able to use the Relay UE to communicate with a wireless network.

Task 2: In response to the association between the Remote UE and the Relay UE, the Relay UE creates a data connection with the P-GW if one does not already exist and provide connectivity to AS1. The key characteristic of the data connection is that it provides access to AS1. A further characteristic could be that the data connection only provides connectivity to AS1.

Task 3: The Remote UE then sets up a secure connection to the application server AS1 in the network. A secure connection allows the Remote UE to communicate with AS1, without another entity (such as the Relay UE) being able to see the information that is exchanged between the Remote UE and AS1. The Relay UE includes a function that upon receiving a request for an Internet Protocol (IP) address associated with the application server AS1 restricts the access of the Remote UE. The access restriction allows the Remote UE to access just specified services of the AS1, until after the Remote UE has been authenticated.

Task 4: The Remote UE requests a Temporary ID from AS1, by sending the private identity of the Remote UE to AS1. The Temporary ID (or more generally a second identity of the Remote UE that is different from a private identity of the Remote UE) can be used by the Remote UE for authentication purposes.

Task 5: The Temporary ID or other second identity can be obtained by AS1 in a number of different ways. In some examples, the second identity is allocated by AS1. In other examples, the second identity is allocated by a mobility management node, such as MMEb in FIG. 2 or another type of mobility management node.

In examples where the second identity is allocated by AS1, two options (Option A and Option C) can be implemented. In alternative examples where the second identity is allocated by a mobility management node, Option B is implemented.

Task 5: With Option A, the second identity (allocated by AS1) and the private identity of the Remote UE are sent in a message to a Home Subscriber Server (HSS), which is an example of Network Node 1 in FIG. 2. The HSS responds to the message by creating a binding of the private identity of the Remote UE with the second identity that is allocated by the AS1.

Task 6: With Option B, AS1 obtains from MMEb or another mobility management node the Temporary ID or another second identity. The second identity can be a GUTI, for example. AS1 obtains the second identity by sending the private identity of the remote UE to MMEb or another mobility management node.

Task 7: AS1 sends the Temporary ID or another second identity to the Remote UE. The Remote UE binds the Temporary ID or other second identity provided by AS1 to the private identity of the Remote UE.

Tasks 8, 9: In response to receiving the Temporary ID or another second identity, the Remote UE registers with the wireless network using the Temporary ID or another second identity. A registration message containing the Temporary ID or another second identity can be sent by the Remote UE to the Relay UE (Task 8), which then forwards (Task 9) the registration message to MMEa (or another mobility management node).

Task 10: With Option A or B, MMEa or another mobility management node sends a request (containing the Temporary ID or other second identifier) to obtain authentication vectors from Network Node 1 (e.g., the HSS). The authentication vectors contain authentication information used to perform authentication of the Remote UE. The HSS either maps the received second identity to the private identity of the remote UE, or the HSS does not perform this mapping.

Tasks 11, 12: With Option C, the Temporary ID or other second identity is of a format (e.g., an IMSI, E.212, etc.) so that the entity (e.g., MMEa or another mobility management node) that receives the Remote UE's registration request (Task 9) sends a request to AS1 (Task 11). AS1 then replaces the Temporary ID or other second identity with the private identity of the Remote UE that was received by AS1 in Task 4. After AS1 has replaced the Temporary ID or other second identity with the private identity of the Remote UE, AS1 sends a request to obtain authentication vectors to Network Node 1 (Task 12).

Task 13: In examples where MMEa and MMEb are not the same entity, MMEa sends an identification request to MMEb to obtain from MMEb identity and context information.

Task 14: In response to the identification request, MMEb sends to MMEa identity and context information. In other examples, MMEa and MMEb can refer to other types of mobility management nodes.

In the ensuing discussion, it is assumed that there is just one mobility management node. However, in general, techniques or mechanisms discussed further below can be applied in examples where there are multiple mobility management nodes (e.g., MMEa and MMEb in FIG. 2).

The following describes further details regarding various different implementations (e.g., Implementation 1, Implementation 2, etc.) according to some embodiments of the present disclosure. Reference is made to different sections, such as section 1.1, as well as sub-sections of these sections.

Section 1.1, Implementation 1

1.1.0, General

In Implementation 1, the Remote UE tunnels via the Relay UE to AS1 in the network. AS1 allocates a second identity (e.g., a Temporary ID or another token) to the Remote UE so that the Remote UE can then subsequently use the second identity when the Remote UE performs a registration via the Relay UE using a Layer 2 connectivity mechanism, for example.

The tunneling is achieved via the Relay UE having a Packet Data Protocol (PDP) connection set up that only allows restricted access by the Remote UE to an application server (e.g., AS1) until the Remote UE is authenticated. Note that the Relay UE allows the restricted access by the Remote UE to a functional entity (AS1) that may be located in a totally different network (from the network that the Relay UE is attached to). In other words, the Relay UE does not only restrict access to an application server of a local network of the Relay UE.

Figure 3:
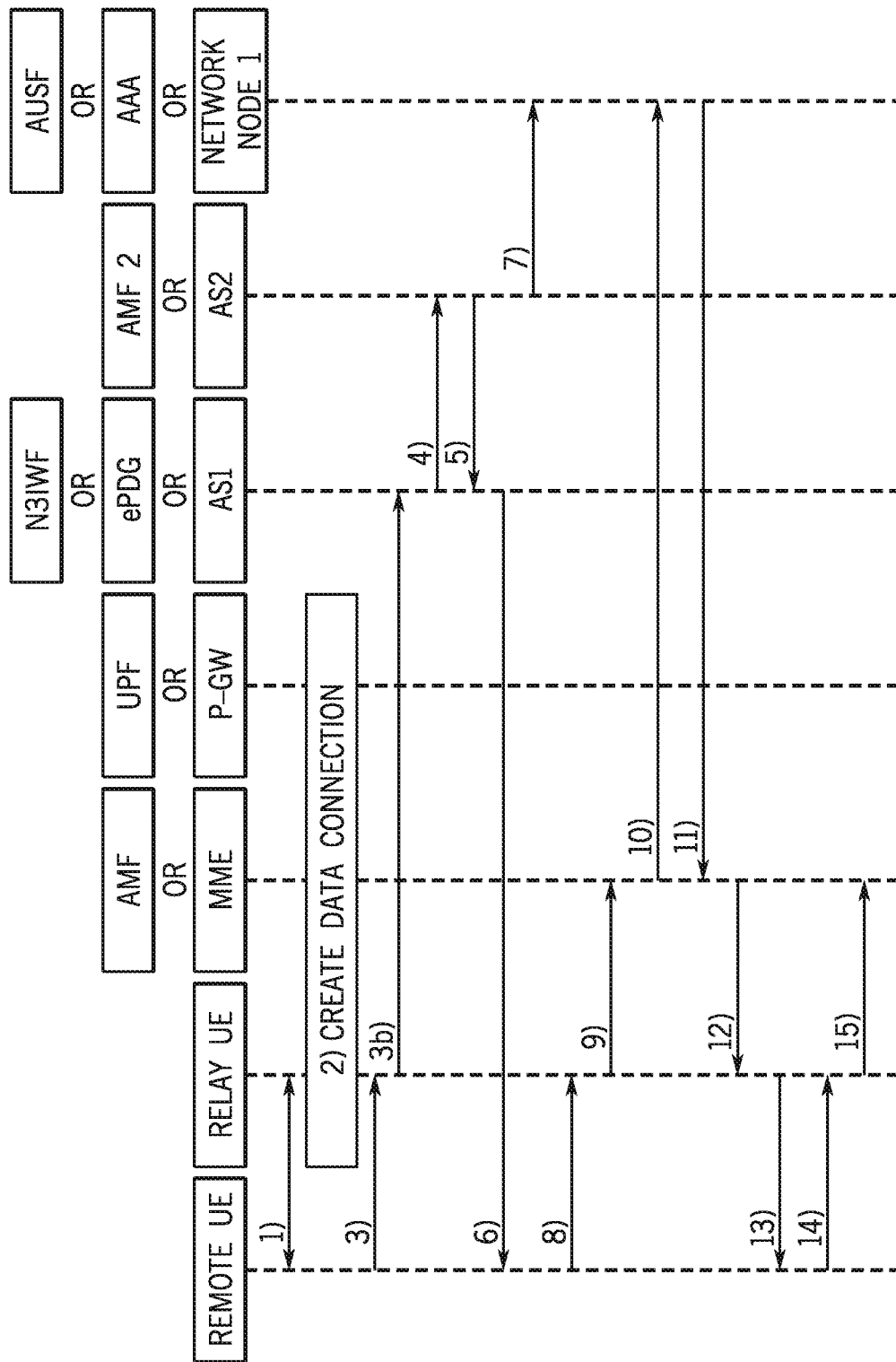
FIG. 3 is a message flow diagram of interactions between various nodes according to a first implementation of the present disclosure.

The following refers to FIG. 3. In FIG. 3, where there are two or more entities depicted in a vertical stack, that implies that any of the entities in the vertical stack can perform the respective function(s) depicted in FIG. 3.

For example, in FIG. 3, either an MME or an AMF can perform tasks of a mobility management node. Also, either a P-GW or a UPF (or alternatively, an entity that includes both P-GW and UPF) can perform tasks of a data gateway. Similarly, any of AS1, ePDG, or N3IWF (or alternatively, any combination of AS1, ePDG, N3IWF) can perform tasks of an application server.

FIG. 3 further shows another application server that can be implemented with AS2 or AMF2 (or alternatively, a combination of AS2 and AMF2). As another alternative, the other application server can be implemented as any or some combination of AS1 and N3IWF. Also, in FIG. 3, the tasks of Network Node 1 can be implemented with an AAA server or an AUSF (or alternatively, a combination thereof).

In FIG. 3, Tasks 3, 3b, and 6 can be implemented using either the Extensible Authentication Protocol (EAP) or OAuth 2.0 protocol to perform authentication.

Note also in FIG. 3 there is no temporal relationship between Tasks 7 and 8—these tasks can occur in any order and asynchronously.

1.1.1. Remote UE Operation

The following refers to various tasks of FIG. 3 that are performed by the Remote UE with Implementation 1.

Task 1: The Remote UE associates/registers with the Relay UE and retrieves information regarding the Relay UE, where the association allows data packets, e.g., IP packets to be sent to the Relay UE by the Remote UE. The information retrieved by the Remote UE from the Relay UE can include any, some, or none of the following: an identity of the Relay UE, the network (e.g., a Registered Public Land Mobile Network or RPLMN) the Relay UE is connected to, the location of the Relay UE, the Address of AS1, and so forth. As used here, a "location" can refer to any or some combination of a mobile country code (MCC), a mobile network code (MNC), a Cell identity, GPS coordinates, waypoint details, a Service Set Identifier (SSID), an Operator code, a Location Area (LA), a Routing Area (RA), a Tracking Area (TA), and so forth.

Task not shown: The Remote UE sets up a secure connection with an AS1 using either information retrieved from the Relay UE or internal configuration information of the Remote UE.

Task 3: The Remote UE sends an indication (using EAP or OAuth, for example) to AS1 that the Remote UE wants to use a Relay UE as a resource to access the core network. The Remote UE can send in the indication or in association with the indication one or more of the following information: an identity of the Relay UE, the network the Relay UE is attached to, the location of the UE (Remote UE and/or Relay UE), indication that the Remote UE wants to use a Relay UE, and so forth.

Task 6: The Remote UE receives a token from AS1, wherein the token is or contains the second identity to use when registering for layer 2 access with the Relay UE.

Task 8: The Remote UE sends an NAS (e.g., Attach, Location Update, Routing Area Update, Tracking Area Update, etc.) message to the Relay UE containing the second identity from the token. The NAS message is an example of a registration request used by the Remote UE to register with the network so that the Remote UE can be authenticated and can obtain network services from the network.

Task 13: The Remote UE receives an authentication challenge per existing standards (standards that are currently promulgated). This authentication challenge is initiated (Task 12) by a mobility management node (e.g., MME or AMF) in response to authentication vectors sent (Task 11) by Network Node 1 (or alternatively, the AAA server or AUSF) responsive to the registration request by the Remote UE. The authentication challenge is forwarded by the Relay UE to the Remote UE (task 12).

Task 14: The Remote UE responds to the authentication challenge per existing standards 1.1.2, Relay UE Operation The following refers to various tasks of FIG. 3 that are performed by the Relay UE with Implementation 1.

Task 1: The Relay UE associates with the Remote UE and may provide any, some, or none of the following information to the Remote UE: an identity of the Relay UE, network that the Relay UE is connected to, the location of the Relay UE, an address of AS1, and so forth.

Task 2: The Relay UE creates a PDP context to create a data connection with the network. The PDP context has the characteristic that the PDP context only provides connectivity by the Remote UE to the address of an application server (e.g., AS1). This task is optional if the PDP context already exists.

Task 3: The Relay UE receives a data packet (e.g., IP packet) from the Remote UE containing a destination address (e.g., IP address). The IP packet can include the indication sent by the Remote UE to AS1 that the Remote UE wants to use a Relay UE as a resource to access the core network.

Task 3b: The Relay UE either:
1) checks to see if the destination IP address received in the IP packet is "allowed" (e.g., the IP address is the address of AS1); the Relay UE forwards the IP packet to AS1 if the destination IP address is "allowed"; or
2) sends the IP packet to an IP address pre-configured in the Relay UE, where the pre-configured IP address is that of AS1.

In some examples, the address of AS1 and an access point name (APN) used to create the PDP context can be obtained by the Relay UE in one of the following ways:
a) the Relay UE receives the address of AS1 and the APN from the network in a Protocols Configuration Options (PCO) information element in a NAS message when the Relay UE communicates (e.g., attaches) to the network; or
b) the address of AS1 and the APN are provisioned in a Universal Integrated Circuit Card (UICC) of the Relay UE (in this case the Relay UE will read the address of AS1 and the APN into memory); or
c) the address of AS1 and the APN are provisioned in the Mobile Equipment (ME), which is a UE without a UICC The PCO information element is defined in 3GPP TS 24.008, and allows a UE, via indicators (where an indicator can include of one or more bits or even the absence of one or more bits in a message) sent to the network, to indicate to the network information that the UE is requesting. The network can respond back to the UE with that information.

Task 8: The Relay UE receives the NAS message (e.g., Attach) sent by the Remote UE.

Task 9: The Relay UE sends the NAS message (e.g., Attach) or other registration request to the network.

Task 12: The Relay UE receives the authentication challenge initiated by a mobility management node (e.g., MME or AMF) in response to authentication vectors sent (Task 11) by Network Node 1 (or alternatively, the AAA server or AUSF) responsive to the registration request by the Remote UE.

Task 13: The Relay UE sends the authentication challenge to the Remote UE.

Task 14: The Relay UE receives a response to the authentication challenge per existing standards.

Task 15: The Relay UE sends the response to the authentication challenge to the network per existing standards.

1.1.3, AS1 Operation

The following refers to various tasks of FIG. 3 that are performed by AS1 with Implementation 1.

Task not shown: AS1 sets up a secure connection with the Remote UE.

Task 3: AS1 receives from the Remote UE an indication that the Remote UE wants to use a Relay UE as a resource. Information sent in or with the indication by the Remote UE to AS1 can include any or some combination of the following: an identity of the Relay UE, the network that the Relay UE is attached to, the location of the UE (Remote UE and/or Relay UE), and so forth.

Task 4: If AS1 is unable to complete the secure connection set-up e.g. because AS1 is in a visited network, then AS1 sends the information received in Task 3 to AS2.

Task 5: If the Remote UE is authorized to use the Relay UE, then AS2 creates an indication that is or contains the second identity for the Remote UE, where the indication can include the token noted above, for example.

Task 6: AS1 sends a token to the Relay UE, where the token is or contains the second identity.

Task 7: AS1 or AS2 sends a message to Network Node 1 containing at least one of: the token, the identity of the Remote UE, the identity of the Relay UE, and so forth.

1.1.4, Network Node 1 Operation

The following refers to various tasks of FIG. 3 that are performed by Network Node 1 with Implementation 1. Network Node 1 can be any of the following: HSS, Home Location Register (HLR)/Authentication Center (AuC), 5G AUSF, AAA server, and so forth.

Task 7: Network Node 1 receives a message from AS1 containing at least one of: the token, the identity of the Remote UE, the identity of the Relay UE, and so forth. In response, Network Node 1 creates a binding or mapping between at least 2 of: the identity of the Remote UE, the identity of the Relay UE, and the second identity in the token.

Task 10: Network Node 1 receives, from the mobility management node (e.g., MME or AMF) a message requesting authentication vectors for the second identity. The message optionally contains the identity of the Relay UE. The message received at Task 10 can be in response to the registration request forwarded by the Relay UE from the Remote UE to the mobility management node. Network Node 1 determines the private identity of the Remote UE using the second identity so authentication vectors can be retrieved. Optionally, Network Node 1 checks the identity of the Relay UE against the identity of the Relay UE created in the binding or mapping that is part of Task 7 above.

Task 11: Network Node 1 sends authentication vectors to the mobility management node.

Section 1.2, Implementation 2

1.2.0, General

Figure 4:
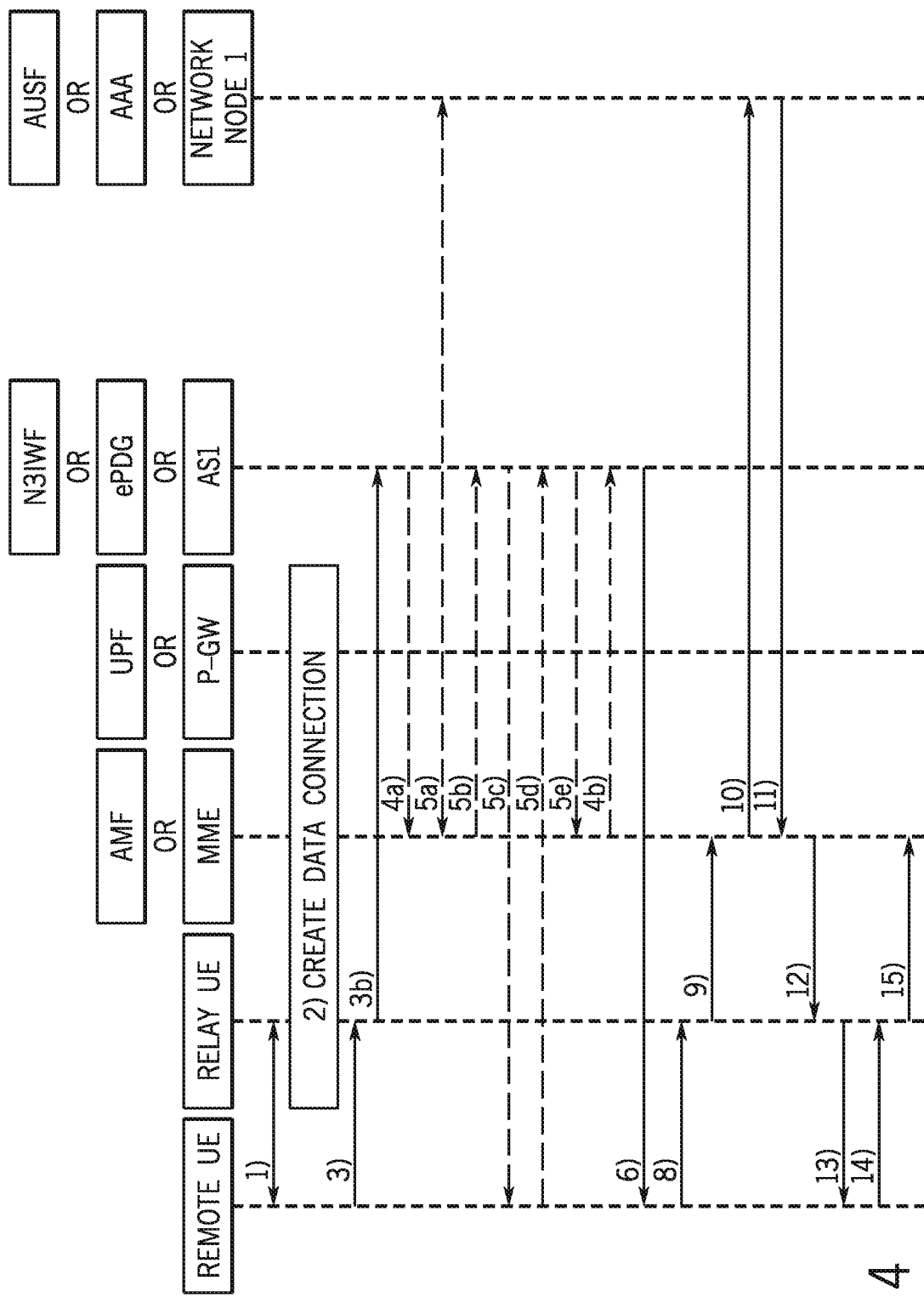
FIG. 4 is a message flow diagram of interactions between various nodes according to a second implementation of the present disclosure.
Figure 5:
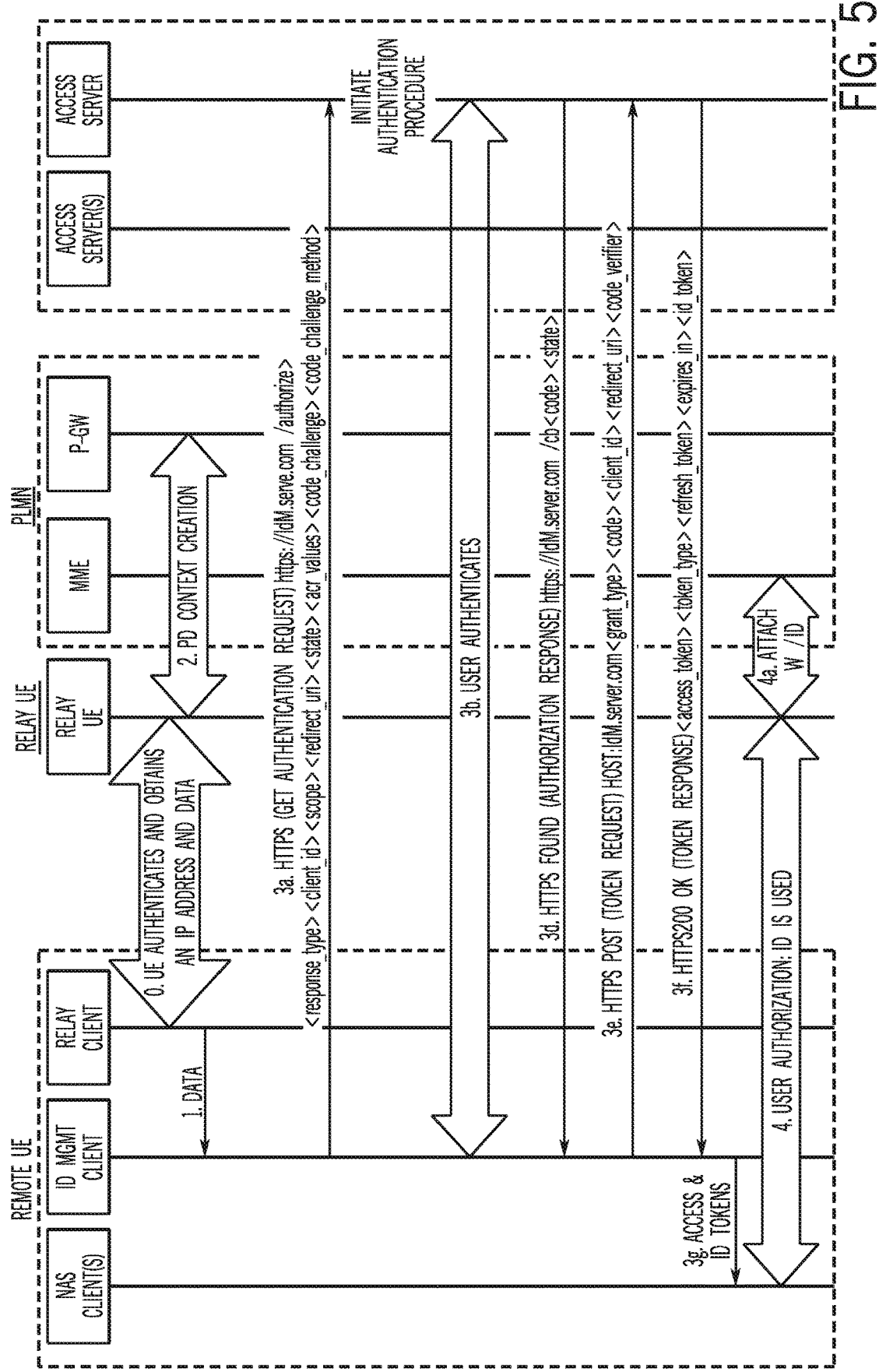
FIG. 5 is a message flow diagram of interactions between various nodes in which OAuth is used according to the first implementation of the present disclosure.

Implementation 2 is depicted in FIG. 4.

Implementation 2 is similar to Implementation 1, except that a mobility management node (e.g., MME or AMF) allocates the second identity for the Remote UE, and sends the allocated second identity back to AS1 so that AS1 can send the second identity to the Remote UE to use in Task 8 of FIG. 4.

As part of the allocation process, the MME authenticates the Remote UE using standard procedures (procedures governed by current standards). The proposed differences between Implementations 1 and 2 are shown in dashed profile in FIG. 4.

Section 2.2 describes three different implementations of Tasks 3-6 (that optionally include Tasks 4a, 4b and 5a-5e) in FIG. 4.

A first of the three different implementations involves sending NAS messages directly from the Remote UE via AS1 to the mobility management node.

A second of the three different implementations involves sending Internet Key Exchange (IKE)/EAP messages from the Remote UE to AS1, where the AS1 then interworks IKE/EAP to NAS messages sent to the mobility management node.

A third of the three different implementations involves sending IKE/EAP messages from the Remote UE to AS1, where the AS1 allocates a Private User ID (e.g., IMSI) to the Remote UE, the IMSI has the characteristics that the routing in the network results in Diameter or Mobility Application Part (MAP) messages that request authentication vectors to be sent to the AS1.

1.2.1, Remote UE Operation

The operation of the Remote UE in Implementation 2 is similar to that of Implementation 1, except with the following additions.

Task 5c: The Remote UE receives an authentication challenge from AS1 that is part of the process of obtaining the second identity from AS1.

Task 5d: The Remote UE sends a response to the authentication challenge back to AS1.

1.2.2, Relay UE Operation

The operation of the Relay UE in Implementation 2 is similar to that of the Relay UE in implementation 1.

1.2.3, AS1 Operation

The operation of AS1 in Implementation 2 is similar to that of AS1 in Implementation 1, except with the following additions and/or modifications.

Task 3: AS1 receives from the Remote UE using a first protocol an indication that the Remote UE wants to use a Relay UE as a resource to access the network. In some examples, the first protocol can include EAP or NAS over IP, or alternatively, a different protocol. Information received by AS1 from the Remote UE as part of or in association with the indication includes one or some of: the identity of the Relay UE, the network that the Relay UE is attached to, the location of the UE (Remote UE and/or Relay UE), and so forth.

Task 4a: In response to the indication and the associated information (sent by the Remote UE at Task 3 and forwarded by the Relay UE at Task 3b), AS1 sends a request to the mobility management node for the second identity using a second protocol. The request can contain the identity of the Remote UE received in Task 3. The second protocol can be different from the first protocol and can be the NAS protocol or a different protocol.

Task 5b: AS1 receives an authentication challenge from the mobility management node using the second protocol.

Task 5c: AS1 sends the authentication challenge to the Remote UE using the first protocol.

Task 5d: AS1 receives the authentication challenge response from the Remote UE using the first protocol Task 5e: AS1 sends the authentication challenge response to the mobility management node using the second protocol.

Task 4b: AS1 receives, from the mobility management node, a response containing the second identity using the second protocol.

Task 6: AS1 sends a token (containing the second identity for the Remote UE) to the Remote UE using the first protocol.

1.2.4, Network Node 1 Operation

The operation of Network Node 1 in Implementation 2 is similar to that of network node 1 in Implementation 1, except with the following addition.

Task 5a: Network Node 1 receives, from the mobility management node, a request for authentication vectors. The request for authentication vectors sent by the mobility management node is in response to the request from AS1 sent to the mobility management node for the second identity.

In response to the authentication vectors received from Network Node 1, the mobility management node sends an authentication challenge to AS1 (Task 5b).

Section 2.1, Implementation 1 Details

The following provides further details relating to the various tasks of Implementation 1 discussed above in Section 1.1.

2.1.1, General Information Flow

The following refers to FIG. 3, which shows a message flow for Implementation 1.

Task 1: The Remote UE sets up a connection with the Relay UE and may obtain, any or some combination of:
 a. an identity of the Relay UE,
 b. an identity of the network (e.g. PLMN code, Service Set Identifier (SSID), etc.) the Relay UE is connected to,
 c. the location of the Relay UE,
 d. the address of AS1 (see Task 2 for possible ways the address can be obtained by the Relay UE).

The Remote UE stores the foregoing information received from the Relay UE.

If the address of AS1 is a Fully Qualified Domain Name (FQDN), one of the following can occur.
 The Relay UE appends information of its location to the FQDN and sends the FQDN and location information to the Remote UE.
 The Remote UE receives the FQDN and location information of the Relay UE. The Remote UE appends the location information to the FQDN.

Task 2: If the Relay UE does not already have a data connection with the network, the Relay UE creates a data connection with the network. The identifier (e.g., APN) used to identify the data network to connect to is either configured on the Relay ME or on the Relay UE's UICC, or is obtained from the network.

In implementations where the identifier of the AS is configured on the Relay ME or the UICC, Table 1 shown in FIGS. 13A-13B sets forth example changes to 3GPP TS 31.102 or 3GPP TS 31.103 that can be made to allow for configuration of the identifier on the Relay ME or UICC. The underlined text in Table 1 below indicates examples of changes made to either of the two standards, 3GPP TS 31.102 or 3GPP TS 31.103. Although proposed example changes to various standards are included in the present description, it is noted that techniques or mechanisms according to some implementations of the present disclosure can be implemented with other changes to the standards, or even to implementations where no changes to standards are used. Also, when the word "shall" appears in a proposed change text, that word can also cover other examples where "shall" is replaced with "should" or "may."

Alternatively, the Relay UE can obtain the address of AS1 from the network, which is described in section 2.1.3 below.

A characteristic of the data connection set up by the Relay UE is that the data connection allows a Remote UE restricted access to only communicate with an application server (AS1).

The Relay UE creates a mapping between the Remote UE and the data connection that is set up.

If the data connection already exists, the Relay UE creates a mapping between the Remote UE and the existing data connection.

Tasks 3, 3b: The Remote UE sets up a secure connection to AS1 in the network and may include in the secure setup message or a subsequent message (e.g., a Register message) in the secure setup procedure any of the following:
 1. any of the information stored by the Relay UE in Task 1; or
 2. the second identity of the Remote UE; or
 3. other information.

In response to receiving an IP packet from the Remote UE, the Relay UE sends the received IP packet from the Relay UE over the data connection that was associated with the Remote UE in Task 2.

The address of AS1 to be used was either obtained in Task 1 or provisioned in the Remote UE (see Task 2 for possible implementation).

Another way of ensuring that the Remote UE is restricted to accessing only the target AS is by the Remote UE using an FQDN to reach the target AS. If the Remote UE sends an FQDN that does not match an FQDN stored in the Relay UE, the Relay UE modifies the FQDN to be that of the one stored in the Relay UE with the Relay UE's location appended, and the Relay UE sends the FQDN in a request, such as a Domain Name System (DNS) request to a DNS server.

The matching of FQDNs involve comparing the location information of the Relay UE included in the syntax of the FQDN received from the Remote UE, to corresponding location information of an FQDN stored in the Relay UE.

Task 4: If AS1 is unable to complete the secure connection setup in response to the message from the Relay UE, e.g., because AS1 is in visited network, then AS1 sends the information received in Task 3 to AS2. AS2 is determined by using the second identity of the Remote UE received in Task 3. This determination is done by using the domain portion of the second identity (e.g., the second identity is in the format of a network access identifier (NAI) [username@domain] where the domain identifies a network operator. If the received NAI domain portion is not handled by AS1, AS1 then routes the message from the Relay UE to AS2.

Task 5: If the Remote UE is authorized to use a Relay UE, then AS2 creates an indication that is or contains the second identity for the Remote UE that is to be sent back in Task 5 (e.g., in a token). The indication is stored against the second identity of the Remote UE. AS2 sends the token or another message containing the indication to AS1.

In Task 5, if the Remote UE is not authorized to use a Relay UE or this specific Relay UE, then AS2 creates an indication that the Remote UE has not been authorized. AS2 sends, to AS1, a message containing an indication that can indicate any or some combination of the following:
1. the Remote UE failed authentication,
2. the Remote UE is not allowed to use a Layer 2 Relay UE,
3. the Remote UE is not allowed to use this specific Layer 2 Relay UE,
4. the Remote UE is not allowed to use a Relay UE when roaming,
5. the Remote UE is not allowed to use a Relay UE connected to this RPLMN, or
6. another indication.

Note that AS2 and AS1 can be the same entity or can be different entities.

Authorization to use a Relay UE can be determined by using any or none of the following: a location of the Remote UE, an identity of the Relay UE, or a network (e.g. RPLMN) that the Relay UE is connected to.

The indication sent by AS2 to AS1 can be based upon any or none of the following: a location of the Relay UE, an identity of the Relay UE, or a network (e.g., RPLMN) that the Relay UE is connected to.

Task 6: AS1 sends, to the Remote UE, a message containing an indication including the second identity for the Remote UE (e.g. token), or an indication that the Remote UE cannot use the Relay UE as a Layer 2 Relay UE.

In response to receiving the indication that the Remote UE cannot use the Relay UE as a Layer 2 Relay UE, the Remote UE can perform any of the following:
 1. display the indication on a display of the Remote UE;
 2. play an audible sound;
 3. if the received indication indicates the Remote UE is not allowed to use this specific Layer 2 Relay UE, then the Remote UE may repeat the process from Task 1 if another Relay UE is available;

4. if the received indication indicates the Remote UE is not allowed to use this specific Layer 2 Relay UE, then the Remote UE may repeat the process from Task 1 if another Relay UE is available, but if the Relay UE indicates the Relay UE is connected to the same RPLMN, the Remote UE does not proceed with any of the other tasks.

Task 7: AS2 sends a message to the HSS containing any or some combination of the following: an indication that may contain the second identity of the Remote UE, or other information.

The HSS receives the message from AS2 and stores, maps, or creates a binding between the indication and the second identity of the Remote UE that was received in the message from AS2.

Task 8: If an indication containing the second identity of the Remote UE is received in Task 7, the Remote UE sends, to the Relay UE, a message containing the second identity of the Remote UE that is part of the token received in the message from AS1.

Task 9: The message of Task 8 from the Remote UE is received by the Relay UE at a layer in the protocol stack such that the Relay UE does not interact with the message. The Relay UE passes, to the mobility management node, the message received at Task 8.

Task 10: In response to the message of Task 9 from the Relay UE, the mobility management node sends, to Network Node 1, a message that includes any or some combination of: the second identity received in the message of Task 9, and the identity of the Relay UE.

Network Node 1 (e.g., the HSS) receives the message of Task 10. The HSS determines (e.g., from the syntax of the second identity) that the second identity included in the message of Task 10 is a Temporary ID and determines if the second identity is assigned to a profile (e.g., second identity profile of the Remote UE). Alternatively, the HSS uses the second identity received to retrieve a subscriber profile associated with the second identity, e.g., in Task 7. As part of retrieving the profile, the HSS obtains or creates authentication vectors associated with the second identity of the Remote UE.

The determination of the Temporary ID can be by range, e.g., if the Temporary ID is in the format of an IMSI, then specific digits within the IMSI structure can signify it is a Temporary ID. An example can be that the Nth (N being an integer between 0 and some non-zero value) in the IMSI structure means the IMSI is temporary.

Task 11: In response to the message of Task 10, the HSS sends, to the mobility management node, the authentication vectors determined in in Task 10.

Task 12: In response to the authentication vectors from the HSS, the mobility management node sends the authentication vectors to the Relay UE.

Task 13: The Relay UE sends the authentication vectors received in Task 12 to the Remote UE. The authentication vectors constitute an authentication challenge to the Remote UE.

Task 14: In response to the authentication challenge, the Remote UE sends, to the Relay UE, an authentication challenge response.

Task 15: The Relay UE sends, to the mobility management node, the authentication challenge response received in Task 14.

Note that in Tasks 12, 13, 14, and 15, the Relay UE transparently receives and sends messages communicated between the Remote UE and the mobility management node.

2.1.2, Communication with Application Server

The following two sub-sections contain more detailed information how tasks 3, 3b, and 6 of FIG. 3 can be performed. One mechanism is to use OAuth and the other is to use EAP.

2.1.2.1, OAuth

Proposed example changes to 3GPP TS 33.180 are set forth in Table 2 shown in FIGS. 14A-14D (the changes are underlined) to use OAuth. Figures of 3GPP TS 33.180 are omitted for better clarity.

Table 3 below describes an alternative example flow for using OAuth.

TABLE 3

[THE TASKS BELOW REFER TO FIG. 5]

| | |
|---|---|
| Step 0: | The UE associates/connects to the RELAY UE and obtains |
| | a. Identity of the Relay UE. |
| | b. Location of the Relay UE |
| | c. Identity of the Network serving the Relay UE. |
| | d. FQDN Address of the Access Server |
| Step 1: | The Relay Client sends to the ID Mgmt Client the information received in Step 0. |
| Step 2: | If the RELAY UE does not already have a PDP session that allows connectivity to the Access Server, the RELAY UE sets up a PDP context using a configured APN. |
| Step 30: | (not shown) The IdM client in the UE sends a DNS query containing FQDN received in step 0 with the Location of the Relay UE appended. The IdM client receives back the IP address of the Access Server. |
| Step 3a: | The IdM client in the UE issues a HTTPS Authentication request to the OIDC based IdM Server in the Access Server. The client includes the code challenge value in this request. |
| Step 3b: | The identity of the Remote UE and associated credentials are provided to the IdM server. The credentials are successfully authenticated (and optionally authorized) by the Access Server. |
| | As part of Step 3a3b or 3e the UE includes the following information in the message sent to the IdM server: |
| | e. Identity of the Relay UE. |
| | f. Location of the Relay UE |
| | g. Identity of the Network serving the Relay UE. |
| Step 3c: | The Access Server may optionally request user consent for granting the IdM client access to the Relay service. |

TABLE 3-continued

[THE TASKS BELOW REFER TO FIG. 5]

Step 3d: The Access Server generates an authorization code that is associated with the code challenge provided by the client. It sends a browser redirect HTTP message with the Authorization Response containing the authorization code.
Step 3e: The UE IdM Client performs a HTTP POST request to exchange the authorization code for an access token. In the request, the client includes the code-verifier string. This string is cryptographically associated with the code challenge value provided in the Authorization Request in Step 3a.
Step 3f: The IdM Server verifies the IdM Client based on the received code-verifier string and issues a 200 OK with an access token and ID token (specific to the NAS client and Relay service(s)) included in it. The ID token contains the JSON Web Token claim containing at least one of identity that the UE should use when it Registers to EPC via Relay UE.
NOTE: The server verifies by calculating the code challenge from the received code verifier and comparing it with the code challenge value provided by the client in Step 3a.
Step 3g: The access token and ID token are made available to the NASclient(s).
Step 4: NAS client REGISTERS and authenticates with the EPC network using the identity received in the ID token:

2.1.2.2, EAP

Table 4 shown in FIGS. 15A-15E shows example changes to 3GPP TS 24.302 (underlined text indicates changes) for using EAP.

2.1.3, Relay UE Provision of Application Server Access Identities

The following describes examples of how a Relay UE is provided with an identity of an application server (e.g., AS1).

2.1.3.1, UE Operation

Figure 6:
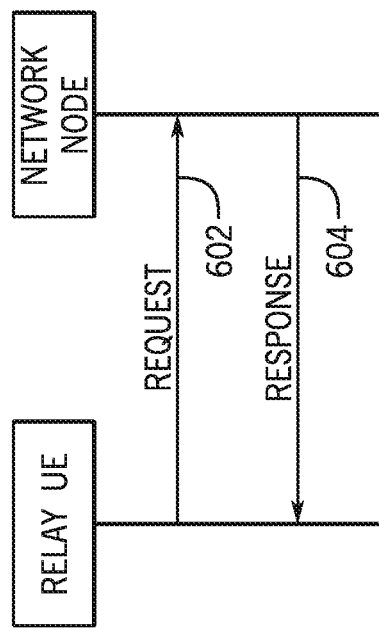
FIG. 6 is a message flow diagram of interactions between a Relay UE and a network node according to the first implementation of the present disclosure.

The following refers to FIG. 6.

Task 602: The Relay UE sends a request to the network (e.g., Attach, IMS Method [e.g., Register, Subscribe], etc.) containing an indication that the UE is a Relay UE, e.g., in a PCO tag.

Task 604: The Relay UE receives a response (to the request) from the network (e.g., Attach Accept, 200 OK, Notify, etc.) containing an indication of the address (e.g., APN, IP address, etc.) to be used to access the application server identities.

The Attach Accept can contain the indication in a PCO field.

The 200 OK or Notify message is an indication of the address of the application server, such as in an example format shown in Table 5.

TABLE 5

+g.3gpp.ims.relay-app-id feature tag set to Application Server ID (e.g. +g.3gpp.ims.relay-app-IP=address, +g.3gpp.ims.relay-app-APN= APN address )

Table 6 shown in FIG. 16 sets forth an example implementation for PCO in which proposed modifications to 3GPP TS 24.008 are indicated by the underlined text (added text) and strikethrough text (deleted text).

When 0012H is included, the coding of the Provisioned services for Access Server can be found in Table 7 (underlined text indicates addition to 3GPP TS 24.008) shown in FIG. 17.

In Table 7, coding for the APN and Access Server address can be found in Table 1.

2.1.3.2, Network Node Operation

The following describes the operation of the network node in FIG. 6.

Task 602—The network node (e.g., MME, S-CSCF, P-GW, AMF, SMF, Application Server, etc.) receives the request from the Relay UE with an indication it is a Relay UE.

Task 604—If the message in Task 602 contains the indication that the UE is a Relay UE and if the network node is configured with an address of an application server, the network node includes that address of the application server in the response to the request sent to the Relay UE.

The address of the application server may be provisioned in an external database, e.g., HSS/HLR, and sent to the network node (e.g., Mobile Switching Center (MSC), MME, Serving Call State Control Function, S-CSCF) via a message (e.g., Insert Subscriber Data according to 3GPP TS 29.002 or 3GPP TS 29.272)

Section 2.2, Implementation 2 Details

The following describes various options that can be used with Implementation 2, including Options A, B, and C.

2.2.1, Option A

Figure 7:
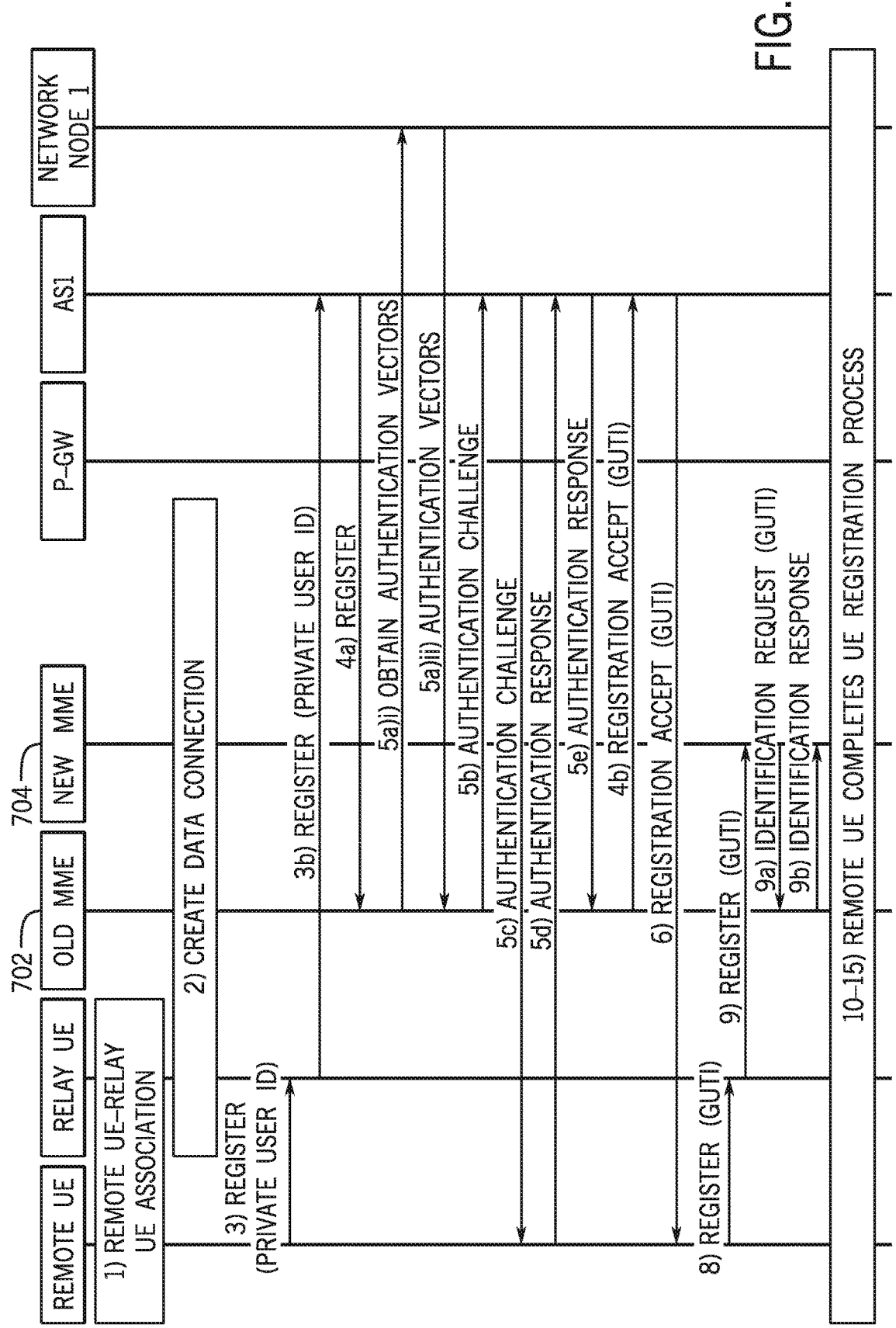
FIG. 7 is a message flow diagram of interactions between various nodes according to a first option of the second implementation of the present disclosure.

FIG. 7 shows Option A of Implementation 2.

The labeling of the arrows in FIG. 7 and description below are out of order on purpose, e.g., Task 4b occurring after Task 5e. They have been chosen to align with the numbering in section 1.2.

Task 1: See section 2.1.1 Task 1.

Task 2: See section 2.1.1 Task 2. The task of creating a PDP context and PDN connection with the network includes the task of Registering (Attaching).

Tasks 3, 3b: See section 2.1.1 Tasks 3) and 3b, with further clarification below.

The Remote UE sends, to AS1, a Register (e.g. Attach, etc.) message containing any or some of: a Private User ID, a first PDN address of the Remote UE (such as in an Evolved Packet System Session Management (ESM) message), the location of the Relay UE, or other information.

Task 4a: AS1 may remove or change the first PDN address, if one is received, in the message of Task 3b. If the first PDN address is included in the message from the Remote UE, the first PDN address may be replaced and set to one that is configured in AS1 (a second PDN address) when the Attach message is sent to the MME.

Figure 8:
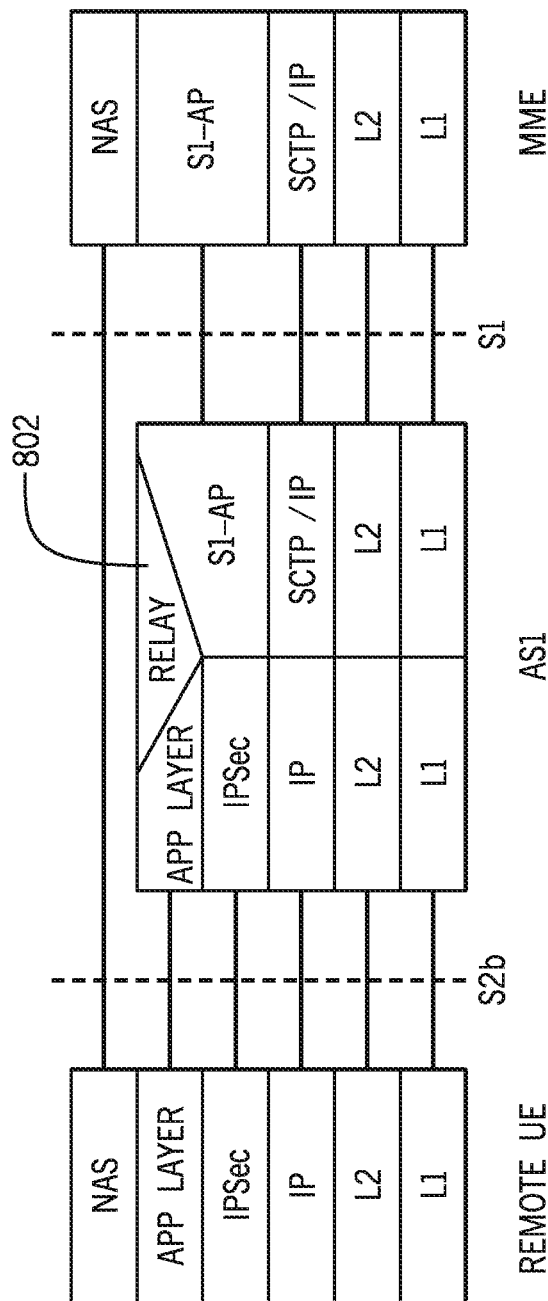
FIG. 8 is a block diagram of protocol stacks in various nodes according to some examples.

FIG. 8 depicts possible protocol stacks in the Remote UE, AS1, and the MME, which show how Task 3b can be interworked to Task 4a and in subsequent interactions between Remote UE↔AS1↔MME.

The protocol stack of the Remote UE include a level 1 (L1) layer, a level 2 (L2) layer, an IP layer, an IP Security (IPSec) layer, an Application layer, and a NAS layer. The AS1 includes a first protocol stack to communicate with the Remote UE, where the first protocol stack includes an L1 layer, an L2 layer, an IP layer, an IPSec layer, and an Application layer. AS1 further includes a second protocol stack to communicate with the MME, where the second protocol stack includes an L1 layer, an L2 layer, a Stream Control Transmission Protocol (SCTP)/IP layer, and an S1 Application Protocol (S1-AP) layer. AS1 also includes a relay function 802 to relay between the first and second protocol stacks of AS1.

The MME has a protocol stack that includes an L1 layer, an L2 layer, an SCTP/IP layer, an S1-AP layer, and a NAS layer.

The interactions between Remote UE↔AS1↔MME include AS1 doing either of:
1. When AS1 receives a message from the Remote UE, the relay function 802 of AS1 takes the NAS message out of the Application layer and inserts the NAS message into an S1-AP message and sends the S1-AP message to the MME.
2. When AS1 receives a message from the MME, AS1 takes the NAS message out of the S1-AP message and sends the message to the Remote UE.

Task 4a: In response to the Register message of Task 3b in FIG. 7, AS1 sends to an MME 702 a Register message (e.g., Attach, Location Update, Routing Area Update, Tracking Area Update, etc.) containing any or some of: a Private User ID, the second PDN address, or other information. The MME 702 is the "old" MME of the Remote UE, i.e., the MME that the Remote UE will be initially associated with based on the location of the Remote UE, for example.

The characteristics of the second PDN address are such that if the Remote UE attempts to use the PDN connection corresponding to the second PDN address for sending data traffic, the traffic will fail.

The location of the Relay UE can be used to determine the MME 702 that the AS1 is to send the Register message to. There may be a mapping in the AS1 between locations and MMEs.

Task 5 a)i): The MME 702 requests authentication vectors from the HSS using the Private User ID received in Task 3b.

Task 5a)ii): In response to the request of Task 5 a)i) from the MME 702, the HSS sends the authentication vectors to the MME 702.

Task 5b: The MME 702 sends an authentication challenge to AS1, e.g., in a NAS Authentication Request.

Task 5c: In response to the authentication challenge, AS1 sends the authentication challenge to the Remote UE.

Task 5d: In response to the authentication challenge, the Remote UE sends an authentication challenge response to AS1.

Task 5e: AS1 sends the authentication challenge response to the MME 7702, e.g., in a NAS Authentication Response.

Task 4b: In response to the authentication challenge response, the MME 702 sends, to AS1, a Registration Accept (e.g., Attach Accept, Location Accept, Routing Area Update Accept, Tracking Area Update Accept, etc.) with a Temporary ID (e.g., GUTI, TMSI, etc.). In Option A, the Temporary ID of the Remote UE is allocated by the MME 702.

Task 6: AS1 sends to the Remote UE the Temporary ID received at Task 4b from the MME 702.

Task 8: After receiving the Temporary ID, the Remote UE sends, to the Relay UE, a Register message containing the Temporary ID. The Register message can include a Attach, Location Update, Routing Area Update, Tracking Area Update, and so forth.

Task 9: See Section 2.1.1 Task 9. Note that in FIG. 7 the Register message can be forwarded by the Relay UE to a new MME 704, which can be the same as or different from the old MME 702.

Tasks 9a, 9b: The new MME 704 obtains context information from the old MME 702 associated with the Remote UE using existing standards.

Tasks 10-15) See Section 2.1.1, Tasks 10-15, respectively.

2.2.2, Option B

Figure 9:
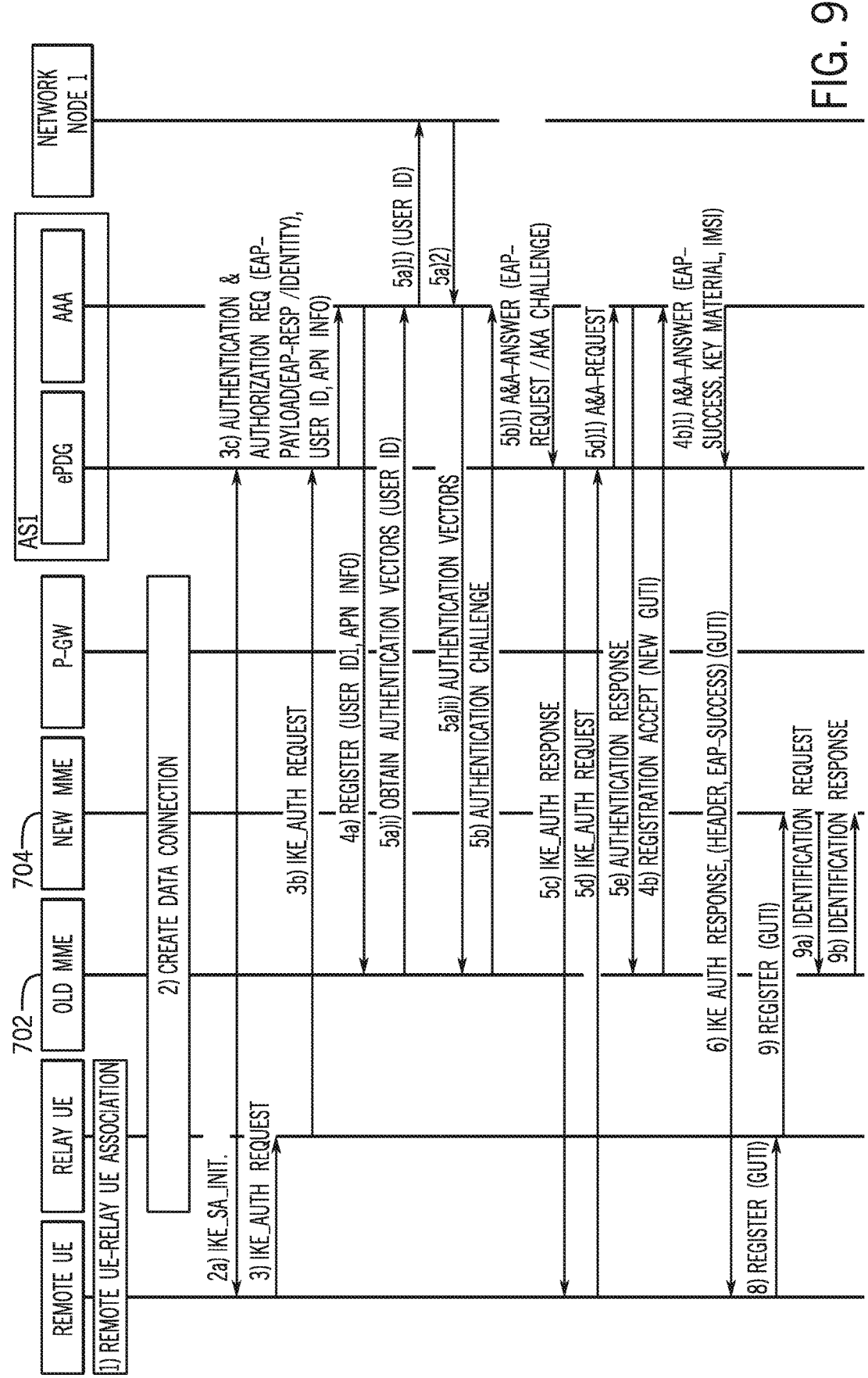
FIG. 9 is a message flow diagram of interactions between various nodes according to a second option of the second implementation of the present disclosure.

FIG. 9 shows Option B of Implementation 2.

Note in FIG. 9, AS1 can be implemented with an ePDG and an AAA server. The ePDG and AAA server can be part of the same network node or can be included in separate network nodes. In addition, in some examples, an MME can be also combined with AS1, as well as the P-GW.

Figure 10:
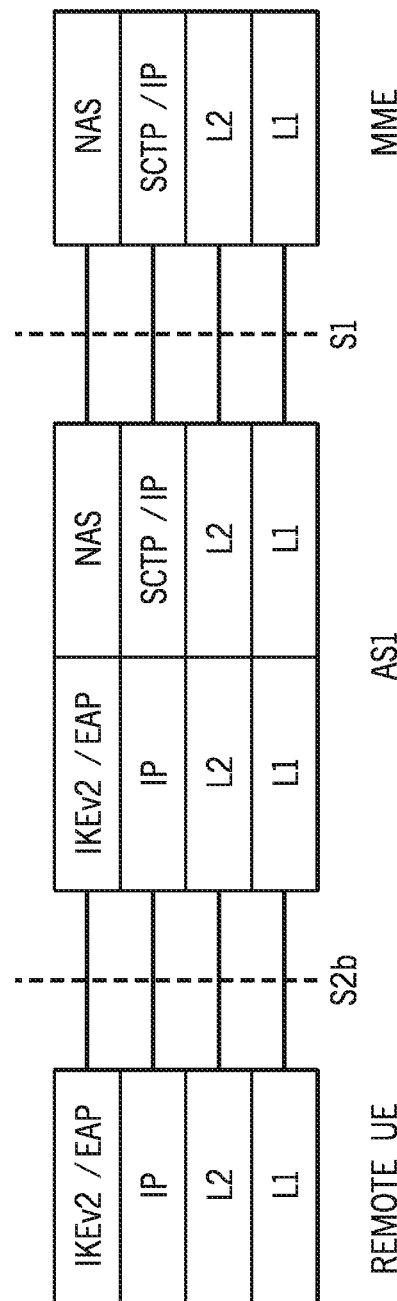
FIG. 10 is a block diagram of protocol stacks in various nodes according to further examples.

FIG. 10 depicts possible protocol stacks when the ePDG and AAA server are combined. As shown in FIG. 10, the Remote UE has a protocol stack that includes an L1 layer, an L2 layer, an IP layer, and an IKEv2/EAP layer. AS1 includes a first protocol stack to communicate with the Remote UE. The first protocol stack includes an L1 layer, an L2 layer, an IP layer, and an IKEv2/EAP layer.

A second protocol stack of AS1 that communicates with an MME includes an L1 layer, an L2 layer, an SCTP/IP layer, and a NAS layer. A protocol stack of the MME includes an L1 layer, an L2 layer, an SCTP/IP layer, and a NAS layer.

In FIG. 10, when AS1 receives an IKE or EAP message, ASI will interwork the content of the IKE or EAP message to a NAS message. This interworking can involve any of the following:
1. AS1 can take a parameter from an EAP message and convert the parameter to an equivalent parameter, e.g., IMSI is coded as an NAI and is converted to a numerical value where each number is represented by 4 bits.
2. AS1 can take a parameter from an EAP message and map the parameter to an equivalent parameter.

When AS1 receives a NAS message in the reverse direction, AS1 performs the reverse conversion or mapping to an EAP message.

The following refers to tasks of FIG. 9.

Task 1: See section 2.1.1 Task 1.

Task 2: See section 2.1.1 task 2)

Task 2a: The Remote UE and the ePDG exchange a first pair of messages, known as IKE_SA_INIT, in which the ePDG and UE negotiate cryptographic associations, exchange nonces, and perform a Diffie_Hellman exchange of Diffie_Hellman values.

Tasks 3, 3b: The Remote UE sends, in a first message (IKE_AUTH Request message) of the IKE_AUTH phase, a user identity such as the Private User ID (in the IDi payload of the first message), APN information (in the IDr payload of the first message), and the Remote UE location (encoded as part of the user identity). The IKE_AUTH Request message also includes security association information for the Remote UE to begin negotiation of child security associations. The Remote UE sends the configuration payload (CFG_REQUEST) within the IKE_AUTH request message to obtain an IPv4 and/or IPv6 home IP address and/or a Home Agent address. The Remote UE omits the AUTH parameter in order to indicate to the ePDG that the Remote UE wants to use EAP over IKEv2. The user identity is compliant with the Network Access Identifier (NAI) format specified in TS 23.003, and contains the IMSI or the pseudonym, as defined for EAP-AKA (Authentication and Key Agreement) in Request for Comments (RFC) 4187.

Note: See descriptions for Tasks 3 and 3b elsewhere within this disclosure regarding how the UE Relay may ensure that messages of Tasks 2a, 3, and 3b are routed to the correct AS1.

Task 3c: In response to the IKE_AUTH Request message, the ePDG sends an Authentication and Authorization Request message to the 3GPP AAA Server (part of Network Node 1). The Authentication and Authorization Request message contains the user identity, the Remote UE location, and the APN included in the received IKE_AUTH Request message. The Remote UE uses the NAI as defined in accordance with clause 19.3 of 3GPP TS 23.003, and the 3GPP AAA server identifies based on the realm part of the NAI that combined authentication and authorization is being performed for tunnel establishment with an ePDG which allows only EAP-AKA.

Task 4a: The AAA server then performs interworking between the EAP message of Task 3c and a NAS message that is sent to an MME 702. The NAS message can include a Register message, an Attach message, a Location Update message, a Routing Area Update message, a Tracking Area Update message, and so forth. The 3GPP AAA server takes the user identity in the Authentication and Authorization Request message received from the ePDG, and generates a Temporary ID (represented as User ID1). The AAA server also, creates a mapping between the user identity and the Temporary ID (User ID1), and includes the Temporary ID (User ID1) in the NAS message of Task 4a sent from the AAA server to the MME 702. The NAS message can also include an APN, which may be taken from Task 3c or can be modified as described in Task 4a of section 2.2.1 (for Option A above).

See Task 6 section 2.2.1 for other possible procedures.

Task 5a)i: The MME 702 sends a request for authentication vectors for the Temporary ID (User ID1) to the AAA server.

Task 5a)1: The AAA server uses the received Temporary ID (User ID1) to find the user identity (see Task 4a above regarding how this mapping is created between Temporary ID (User ID1) and the user identity). The AAA server sends, to an HSS (part of Network Node 1), a request for authentication vectors for the user identity.

Task 5a)2: In response to the request for authentication vectors, the HSS sends, to the AAA server, a message contain authentication vectors. The AAA server receives the authentication vectors and the authentication vectors against the user identity.

Task 5a)ii: The AAA server sends, to the MME 702, a message containing the received authentication vectors.

Task 5b: The MME 702, in response to receiving the authentication vectors from the AAA server, sends a NAS Authentication Request message (an authentication challenge) to the AAA server.

Task 5b)1: The AAA server interworks the NAS Authentication Request message to an EAP Request/Challenge message. The AAA Server initiates the authentication challenge by sending the authentication challenge in an Authentication and Authorization Answer message to the ePDG, which is responsive to the Authentication and Authorization sent by the ePDG to the AAA server. The AAA server also stores the authentication vectors that were used in the NAS Authentication Request message so that the AAA server can later determine which set of authentication vectors were used to challenge the Remote UE. This information of Tasks 5b)1 and 4b)1 (discussed further below) are used to create the correct key material.

Task 5c: The ePDG responds to the Authentication and Authorization Answer message by sending an IKE_AUTH Response message to the Remote UE, where the IKE_AUTH Response message is responsive to the IKE_AUTH Request message of Tasks 3 and 3b. The IKE_AUTH Response message contains the ePDG's identity, a certificate, and an AUTH parameter to protect the previous message the ePDG sent to the Remote UE (in the IKE_SA_INIT exchange of Task 2a). The EAP message received from the AAA Server (EAP-Request/AKA-Challenge) is included in the IKE_AUTH Response message to start the EAP procedure over IKEv2.

Task 5d: In response to the IKE_AUTH Response message, the Remote UE checks the authentication parameters and responds to the authentication challenge by sending, to the ePDG, another IKE_AUTH Request message. The IKE_AUTH request message of Task 5d includes an EAP message (EAP-Response/AKA-Challenge) containing the Remote UE's response to the authentication challenge.

Task 5d)1: The ePDG forwards the EAP-Response/AKA-Challenge message to the AAA server in an Authentication and Authorization Request message.

Task 5e: The AAA server takes the authentication challenge response from Task 5d)1 and includes the authentication challenge response in an Authentication Response message to the MME 702.

Task 4b: See section 2.2.1 Task 4b.

Task 4b)1: The AAA server receives the Attach Accept message from the MME 702 (Task 4b), and interworks the Attach Accept message to an EAP Success message. The AAA server takes a Temporary ID (e.g., GUTI) from Task 4b and includes it in the EAP Success message.

If all checks are successful, the AAA server sends, to the ePDG, the final Authentication and Authorization Answer (with a result code indicating success) including the relevant service authorization information, GUTI, the EAP success and the key material to the ePDG. The key material includes a Master Session Key (MSK) generated during the authentication process. When the SWm and SWd interfaces between the ePDG and the AAA server are implemented using Diameter, the MSK is encapsulated in the EAP-Master-Session-Key-AVP, as defined in RFC 4072].

Task 6: The ePDG sends, to the Remote UE, an IKE_Auth Response message containing the Temporary ID (e.g., GUTI). The IKE_Auth Response message is responsive to the IKE_Auth Request message of Task 5d.

Tasks 8, 9, 9a, 9b, 10-15: See section 2.2.1 Tasks 8, 9, 9a, 9b, 10-15, respectively.

2.2.3, Option C

Figure 11:
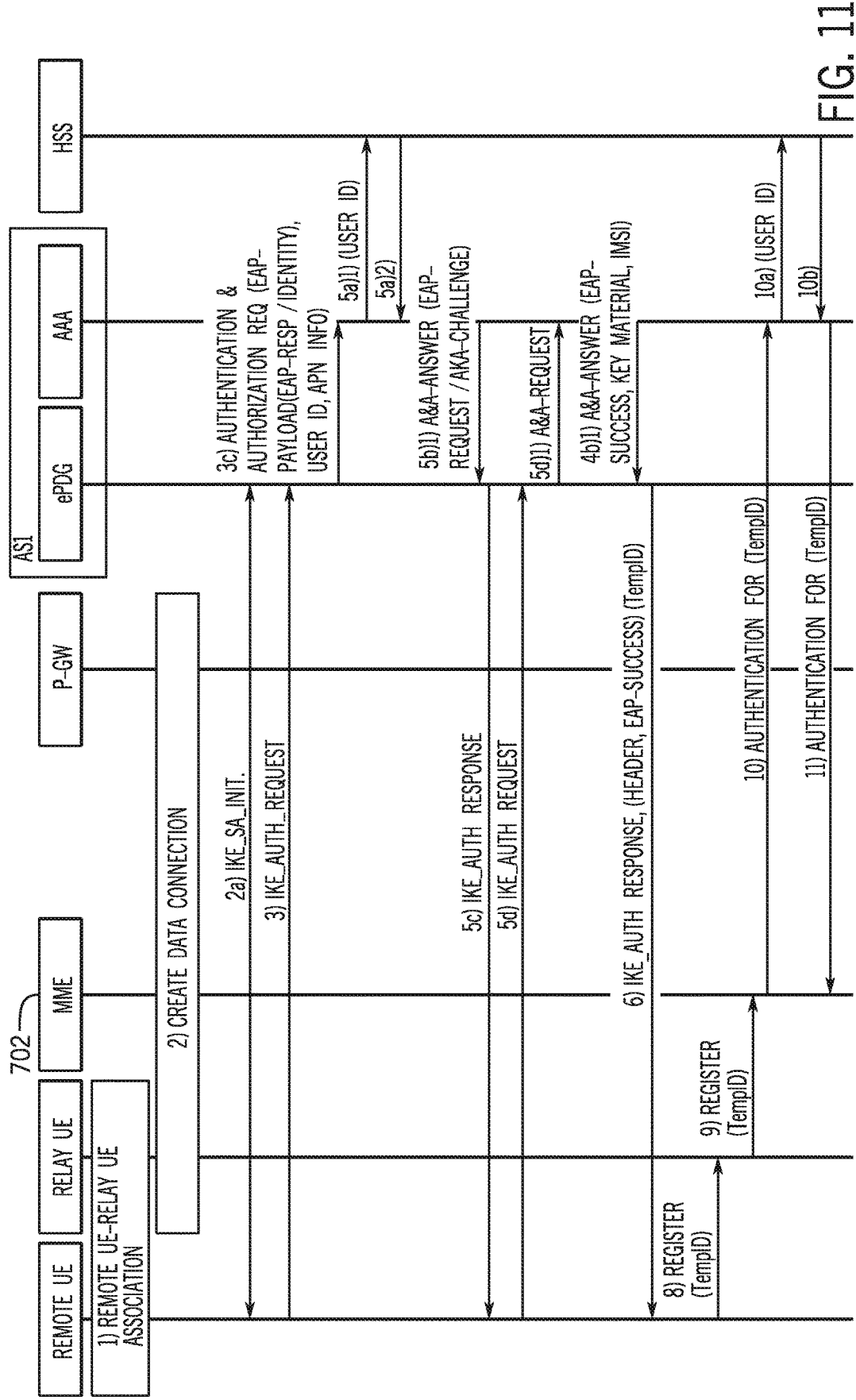
FIG. 11 is a message flow diagram of interactions between various nodes according to a third option of the second implementation of the present disclosure.

FIG. 11 shows Option C of Implementation 2.

In Option C, the Remote UE uses non-3GPP S2b procedures to authenticate with an ePDG. This authentication process provides an identity that the Remote UE can use for registering with the core network via a Relay UE.

Tasks 1, 2, 2a, 3, 3c, 5a)1, 5a)2, 5b)1, 5c, 5d, 5d)1, 4b)1, See section 2.2.2 Tasks 1, 2, 2a, 3, 3c, 5a)1, 5a)2, 5b)1, 5c, 5d, 5d)1, 4b)1, respectively.

Task 6: See section 2.2.2 Task 6. In addition, when the ePDG sends the IKE_AUTH Response message of Task 6, the ePDG also assigns or allocates a Temporary ID (e.g., having a format of an IMSI, etc). The ePDG creates a binding between the user identity received in Task 3 and the Temporary ID (e.g., IMSI, etc.).

Task 8: See section 2.2.2 Task 8. The UE sends, to the Relay UE, a message, e.g., Attach, Tracking Area Update, Location Update, etc., containing the Temporary ID received in Task 6.

Task 9: See section 2.2.2 Task 9.

Task 10: The MME 702 sends, to the AAA server, a request for authentication vectors for the Temporary ID received in Task 9.

Note that the value of the Temporary ID is such that the routing of the request for authentication vectors terminates on the entity that allocated this Temporary ID (which in this case is the AAA server).

Task 10a: Upon receipt of a request for authentication vectors for the Temporary ID received in Task 10, the AAA server uses the Temporary ID to determine if a mapping exists to another identity (e.g., the private identity of the Remote UE). If another identity exists (i.e., the user identity received in Task 3), the AAA server uses the other identity to retrieve authentication vectors. The AAA server sends a request for authentication vectors for the other identity to the HSS Task 10b: The HSS sends the requested authentication vectors to the AAA server.

Task 11: The AAA sever sends the authentication vectors to the MME 702.

System Example

Figure 12:
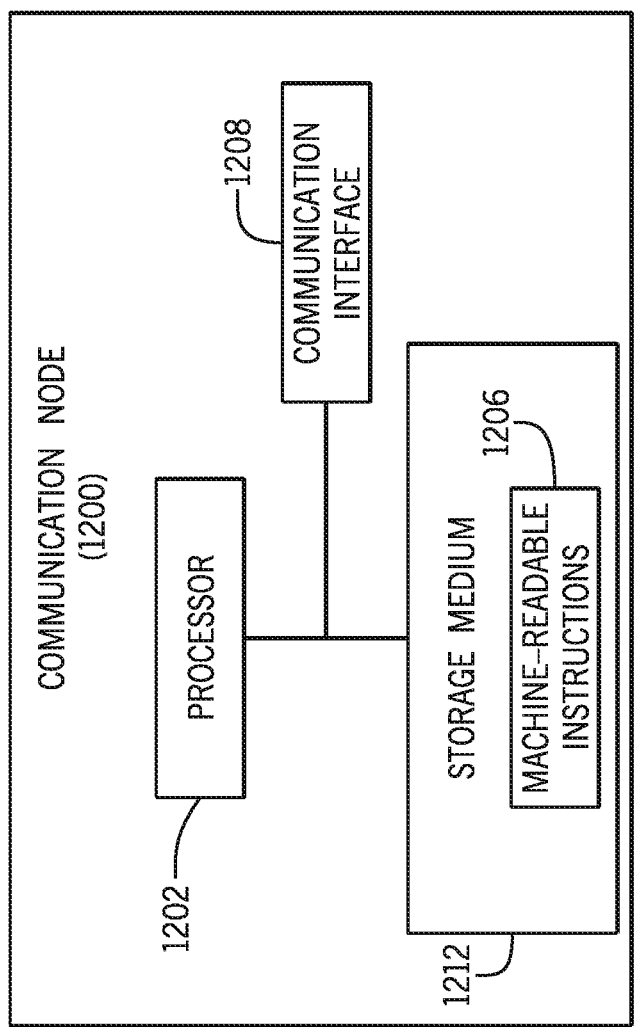
FIG. 12 is a block diagram of a network node according to some examples.

FIG. 12 is a block diagram of a communication node 1200, which can be any of a Remote UE, a Relay UE, an application server, a mobility management node, a network node, or any other type of node that can be involved in processes according to the present disclosure.

The communication node 1200 includes a processor 1202 (or multiple processors). A processor can include a microprocessor, a core of a multi-core microprocessor, a microcontroller, a programmable integrated circuit, a programmable gate array, or another hardware processing circuit.

The communication node 1200 also includes a non-transitory machine-readable or computer-readable storage medium 1204 that stores machine-readable instructions 1206 that are executable on a processor (i.e., one or more processors 1202) to perform various tasks as discussed in the present disclosure.

The communication node 1200 also includes a communication interface 1208 to perform wired or wireless communications. The communication interface 1208 can include a network interface controller, a radio transceiver, and so forth.

The storage medium 1204 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
sending, by a first user equipment (UE), an indication to an application server that the first UE is to use a wireless relay UE to access a wireless network, wherein the indication is sent by the first UE to the application server using messaging according to a first protocol;
receiving, by the first UE from the application server and in response to the indication, a first identity different from a second identity of the first UE; and
using, by the first UE, the first identity to register with the wireless network to authenticate the first UE.

2. The method of claim 1, further comprising:
receiving, by the first UE from the wireless relay UE, information of the wireless relay UE,
wherein the indication comprises the information of the wireless relay UE.

3. The method of claim 2, wherein the information of the wireless relay UE is selected from among an identity of the wireless relay UE, information of a network the wireless relay UE is attached to, and a location of the wireless relay UE.

4. The method of claim 1, wherein the first UE tunnels, via the wireless relay UE, to the application server to perform the sending and the receiving.

5. The method of claim 4, wherein the tunneling is based on the wireless relay UE having a connection that only allows access to the application server.

6. The method of claim 1, wherein the first identity is allocated by the application server or a mobility management node.

7. The method of claim 1, further comprising:
establishing, by the first UE, a secure connection with the application server,
wherein the sending and receiving are performed in the secure connection.

8. The method of claim 1, wherein the sending and the receiving use an Extensible Authentication Protocol (EAP) or an OAuth Protocol.

9. The method of claim 1, comprising:
as part of registering with the wireless network:
sending, by the first UE to the wireless relay UE, an attach message that contains the first identity of the first UE, the attach message to cause the wireless network to send a request for authentication information to a network node that has received, from the application server, the first identity of the first UE;
receiving, by the first UE from the network node, the authentication information; and
responding, by the first UE, to the authentication information to perform authentication of the first UE in the wireless network.

10. A relay user equipment (UE) comprising:
a wireless interface to communicate wirelessly; and
at least one processor configured to:
associate with a remote UE;
send a first message to a network, the first message containing a first indication of the relay UE;
receive, from the network, a second message responsive to the first message, the second message containing an identity of an application server;

establish a connection with the network to provide connectivity to the application server, wherein the establishing of the connection with the network uses the identity of the application server;

receive, from the remote UE, a first packet comprising a second indication that the remote UE is to use the relay UE to access the network;

forward the first packet comprising the second indication to the application server;

relay, via the established connection, a second packet between the remote UE and the application server, the second packet sent in a secure connection between the remote UE and the application server and containing a temporary identity of the remote UE different from a first identity of the remote UE, the temporary identity provided by the application server in response to the second indication; and relay, via the established connection, attach and authentication messages between the remote UE and the application server.

11. An application server comprising:

a communication interface; and at least one processor coupled to the communication interface and configured to:

receive, from a first user equipment (UE), a first identity of the first UE and an indication that the first UE is to use a wireless relay UE to access a wireless network, wherein the indication is communicated using messaging according to a first protocol; and send, to the first UE in response to the indication, a second identity of the first UE, the second identity different from the first identity and for use by the first UE in authenticating in the wireless network.

12. The application server of claim 11, wherein the at least one processor is configured to:

send a request to a mobility management node for the second identity of the first UE, the request sent in messaging according to a second protocol different from the first protocol.

13. The application server of claim 12, wherein the first protocol is one of an Extensible Authentication Protocol (EAP) or a Network Access Stratum (NAS) over Internet Protocol (IP), and the second protocol is a NAS protocol.

14. The application server of claim 12, wherein the at least one processor is configured to:

receive an authentication challenge in messaging according to the second protocol from the wireless network;

send, to the first UE, the authentication challenge in messaging according to the first protocol;

receive, from the first UE, an authentication challenge response in messaging according to the first protocol;

send, to the wireless network, the authentication challenge response in messaging according to the second protocol;

receive, from the wireless network, a response to the request, the response being in messaging according to the second protocol and including the second identity; and send, to the first UE, the second identity in messaging according to the first protocol.

15. The application server of claim 11, wherein the application server is a first application server, and wherein the at least one processor is configured to:

receive, from the first UE, a request to establish a secure connection between the first UE and the first application server;

in response to determining that the first application server is unable to establish the secure connection, send information associated with the request to a second application server;

receive, from the second application server, the second identity.

16. The method of claim 1, wherein the first identity is received by the first UE from the application server that obtained the first identity from a mobility management node using messaging according to a second protocol different from the first protocol.

* * * * *